United States Patent
Liu et al.

(10) Patent No.: US 12,058,617 B2
(45) Date of Patent: Aug. 6, 2024

(54) METHODS AND APPARATUS FOR A GROUP WAKE UP SIGNAL

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/408,449

(22) Filed: May 9, 2019

(65) Prior Publication Data
US 2019/0349856 A1   Nov. 14, 2019

Related U.S. Application Data

(60) Provisional application No. 62/754,533, filed on Nov. 1, 2018, provisional application No. 62/739,101, filed
(Continued)

(51) Int. Cl.
*H04W 52/02* (2009.01)
*H04W 72/0453* (2023.01)

(52) U.S. Cl.
CPC ... *H04W 52/0219* (2013.01); *H04W 52/0229* (2013.01); *H04W 72/0453* (2013.01)

(58) Field of Classification Search
CPC ......... H04W 52/0219; H04W 72/0453; H04W 52/0229; H04W 68/00; H04W 76/28; H04W 52/0216; H04W 52/028
See application file for complete search history.

(56) References Cited

U.S. PATENT DOCUMENTS 7,389,528 B1 *   6/2008   Beser .................. H04L 12/12
                                                            725/111
2010/0214969 A1   8/2010   Lamm et al.
(Continued)

FOREIGN PATENT DOCUMENTS

CN   107360619 A       11/2017
CN   110839214 A  *   2/2020  ............ H04W 28/20
(Continued)

OTHER PUBLICATIONS

AD-HOC Chair (NTT DOCOMO et al): "Chairman's Notes of AI 6.2.5 Even Further Enhanced MTC for LTE", 3GPP TSG RAN WG1 Meeting #92, 3GPP Draft; R1-1803146, , 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Mar. 5, 2018 (Mar. 5, 2018), pp. 1-6, XP051398716, Retrieved from the Internet: URL: https://www.3gpp.org/ftp/tsg_ran/WG1_RL1/TSGR1_92/Docs/ [retrieved on Mar. 5, 2018], Paragraph [6.2.5.3].
(Continued)

*Primary Examiner* — Un C Cho
*Assistant Examiner* — Lalita W Pace
(74) *Attorney, Agent, or Firm* — Procopio, Cory, Hargreaves & Savitch LLP

(57) ABSTRACT

The present disclosure relates to transmitting and receiving an improved wake-up signal (WUS) by grouping user equipment (UE). A base station may group and assign a plurality of UEs into UE groups. The base station can then determine and transmit a WUS identifying certain UEs to wake-up for a paging occasion (PO). The UEs can listen for their corresponding WUS. After receiving the WUS, the UEs can wake-up for the PO. The base station can also determine the total amount of different UE groups. Within each group, there can be both legacy and updated UEs, wherein each
(Continued)

US 12,058,617 B2
Page 2 legacy UE receives the same legacy WUS and the updated UEs receive a group-specific WUS. The base station can also balance the amount of legacy and updated UEs within each group based on different factors. Also, each WUS can be turned on or off, which can be carrier specific.

78 Claims, 23 Drawing Sheets

Related U.S. Application Data on Sep. 28, 2018, provisional application No. 62/717,597, filed on Aug. 10, 2018, provisional application No. 62/670,690, filed on May 11, 2018.

(56) References Cited

U.S. PATENT DOCUMENTS

| | | | |
|---|---|---|---|
| 2010/0271175 A1* | 10/2010 | Chou | H04W 68/02 340/7.25 |
| 2012/0275365 A1* | 11/2012 | Anderson | H04W 52/0219 370/311 |
| 2016/0007288 A1 | 1/2016 | Samardzija et al. | |
| 2017/0332327 A1 | 11/2017 | Fang et al. | |
| 2018/0020404 A1 | 1/2018 | Huang et al. | |
| 2018/0115950 A1 | 4/2018 | Asterjadhi et al. | |
| 2018/0184379 A1* | 6/2018 | Liu | H04W 74/006 |
| 2018/0310249 A1* | 10/2018 | Wilhelmsson | H04W 52/0245 |
| 2019/0124655 A1* | 4/2019 | Liu | H04L 5/0094 |
| 2019/0159127 A1* | 5/2019 | Son | H04W 52/0216 |
| 2019/0159128 A1* | 5/2019 | Lin | H04L 5/0023 |
| 2019/0239189 A1* | 8/2019 | Hwang | H04W 52/0229 |
| 2019/0342833 A1* | 11/2019 | Astrom | H04W 8/08 |
| 2020/0015166 A1* | 1/2020 | Ahn | H04W 52/0219 |
| 2020/0022081 A1* | 1/2020 | Ljung | H04L 1/0004 |
| 2020/0022082 A1* | 1/2020 | Ljung | H04W 72/042 |
| 2020/0029302 A1* | 1/2020 | Cox | H04W 68/02 |
| 2020/0053645 A1* | 2/2020 | Charbit | H04W 68/10 |
| 2020/0053647 A1* | 2/2020 | Chae | H04W 72/0446 |
| 2020/0092808 A1* | 3/2020 | Beale | H04W 52/0235 |
| 2020/0145921 A1* | 5/2020 | Zhang | H04W 76/27 |
| 2020/0163018 A1* | 5/2020 | Wilhelmsson | H04W 52/0206 |
| 2020/0280959 A1* | 9/2020 | Sharma | H04W 52/0219 |
| 2020/0344688 A1* | 10/2020 | Lv | H04J 3/0682 |
| 2021/0314869 A1* | 10/2021 | Ye | H04W 72/0446 |

FOREIGN PATENT DOCUMENTS

| | | | | |
|---|---|---|---|---|
| EP | 3603223 A1 | 2/2020 | | |
| WO | 2018017008 A1 | 1/2018 | | |
| WO | 2018175760 A1 | 9/2018 | | |
| WO | WO-2018204799 A1 * | 11/2018 | | H04W 52/0216 |
| WO | WO-2019033112 A1 * | 2/2019 | | H04W 52/0216 |
| WO | WO-2019095323 A1 * | 5/2019 | | H04W 52/0216 |

OTHER PUBLICATIONS

Huawei et al: "Wake-up Signal in NB-IoT and eMTC", 3GPP TSG RAN WG1 Meeting #101bis, 3GPP Draft; R2-1805082 Wake-Up Signal in NB-IOT and EMTC, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-11, XP051428765, Retrieved from the Internet: URL: http://www.3gpp.org/ftp/Meetings_3GPP_SYNC/RAN2/Docs/ [retrieved on Apr. 14, 2018].

Intel Corporation: "Configurations of Wake-up Signal for feNB-IoT", 3GPP TSG RAN WG1 Meeting #92bis, 3GPP Draft; R1-1804698, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 7, 2018 (Apr. 7, 2018), 3 Pages, XP051414062, Retrieved from the Internet: URL: https://www.3gpp.org/ftp/tsg_ran/WG1_RL1/TSGR1_92b/Docs/ [retrieved on Apr. 7, 2018], Paragraphs [0001]-[0002].

International Search Report and Written Opinion—PCT/US2019/031855—ISA/EPO—Aug. 22, 2019.

QUALCOMM Incorporated; "Discussion on UE-Group Wake-up Signal for MTC", 3GPP TSG RAN WG1 Meeting #94, 3GPP Draft; R1-1809022_MWUS UE Grouping, 3rd Generation Partnership Project (3GPP), Mobile Competence Centre, 650, Route Des Lucioles; F-06921 Sophia-Antipolis Cedex, France, vol. RAN WG1, No. Gothenburg, Sweden; Aug. 20, 2018-Aug. 24, 2018., Aug. 11, 2018 (Aug. 11, 2018), 4 Pages, XP051516394, Retrieved from Internet: URL: http://www.3gpp.org/ftp/tsg_ran/WG1_RL1/TSGR1_94/Docs/ R1-1809022.zip [retrieved on Aug. 11, 2018].

SONY: "Considerations of Using WUS in efeMTC", 3GPP TSG RAN WG1 Meeting #92bis, 3GPP Draft; R1-1804604—REL-15 EFEMTC—WUS V02, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 6 Pages, XP051426873, Retrieved from the Internet: URL: http://www.3gpp.org/ftp/Meetings_3GPP_SYNC/RAN1/Docs/ [retrieved on Apr. 15, 2018], Paragraph [02.1].

SONY (Updated Revision R2-1712993): "WUS Aspects on Grouping and Mobility for efeMTC and feNB-IoT", 3GPP TSG RAN WG2 Meeting #101, 3GPP Draft; R2-1803134 WUS Aspects on Grouping and Mobility for efeMTC and feNB-IoT, 3rd Generation Partnership Project (3GPP), Mobile Competence Centre, 650, Route Des Lucioles; F-06921 Sophia-Antipolis Cedex, France, vol. RAN WG2, No. Athens, Greece; Feb. 26, 2018-Mar. 2, 2018, Feb. 15, 2018 (Feb. 15, 2018), pp. 1-6, XP051399692, Retrieved from the Internet: URL: https://www.3gpp.org/ftp/tsg_ran/WG2_RL2/TSGR2_101/Docs/ [retrieved on Feb. 15, 2018], Paragraphs [0002] [02 .1], [02. 2].

Intel Corporation: "Configurations of Wake-up Signal for feNB-IoT", 3GPP TSG RAN WG1 Meeting #91, R1-1720046, Reno, USA, Nov. 27-Dec. 1, 2017, 4 Pages.

Nokia et al., "Wake-up Signal Configurations and Procedures", 3GPP TSG RAN WG1 Meeting #92bis, R1-1804249, No. Sanya, China, Apr. 16, 2018-Apr. 20, 2018, 8 Pages, Apr. 6, 2018.

OPPO: "On Wake-Up Signal Transmission", 3GPP TSG RAN WG1 Meeting #90bis, R1-1718063, No. Prague, CZ, Oct. 9, 2017-Oct. 13, 2017, 4 Pages, Sep. 30, 2017.

Huawei, et al., "Wake-Up Signal in NB-IoT and MTC", 3GPP TSG-RAN WG2 Meeting #101, R2-1802223, No. Athens, Greece, Feb. 26, 2018-Mar. 2, 2018, 8 Pages, Part 2.3.

ZTE, et al., "Further Consideration on Wake-up Signal", 3GPP TSG-RAN WG2 Meeting#101bis, R2-1805955 (Resubmission of R2-1802058), No. Sanya, China, Apr. 16, 2018-Apr. 20, 2018, 4 Pages.

VIVO: "Remaining Aspects on Wake-up Signals for feNB-IoT", 3GPP TSG RAN WG1 Meeting #92bis, R1-1803805, Sanya, China, Apr. 16-20, 2018, 7 Pages.

* cited by examiner

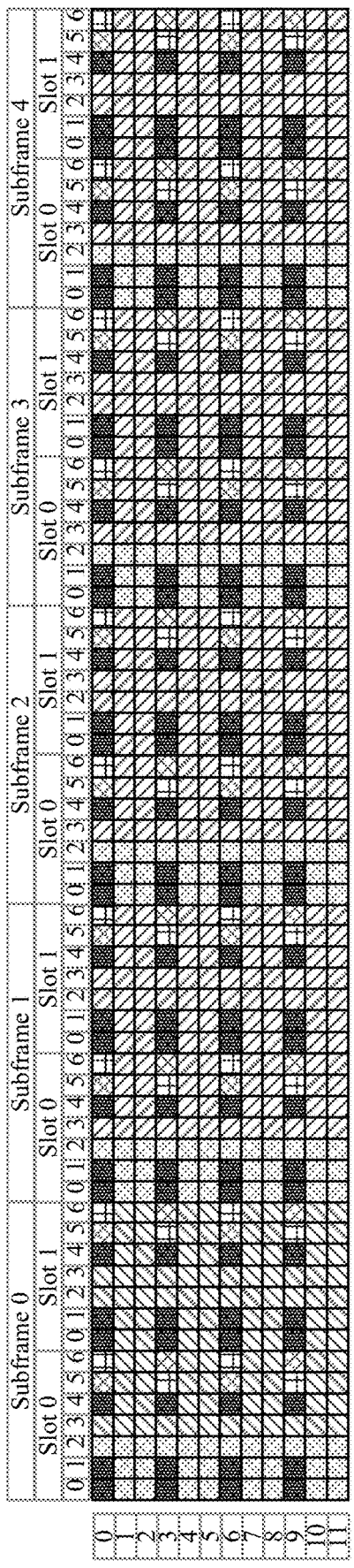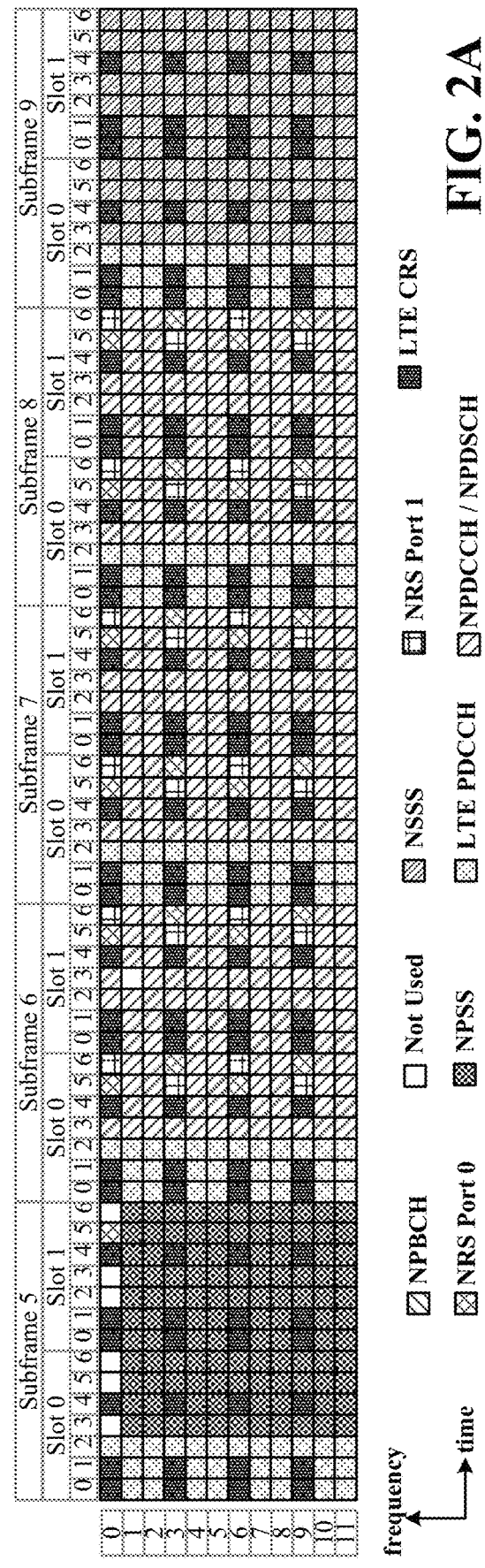
FIG. 2A

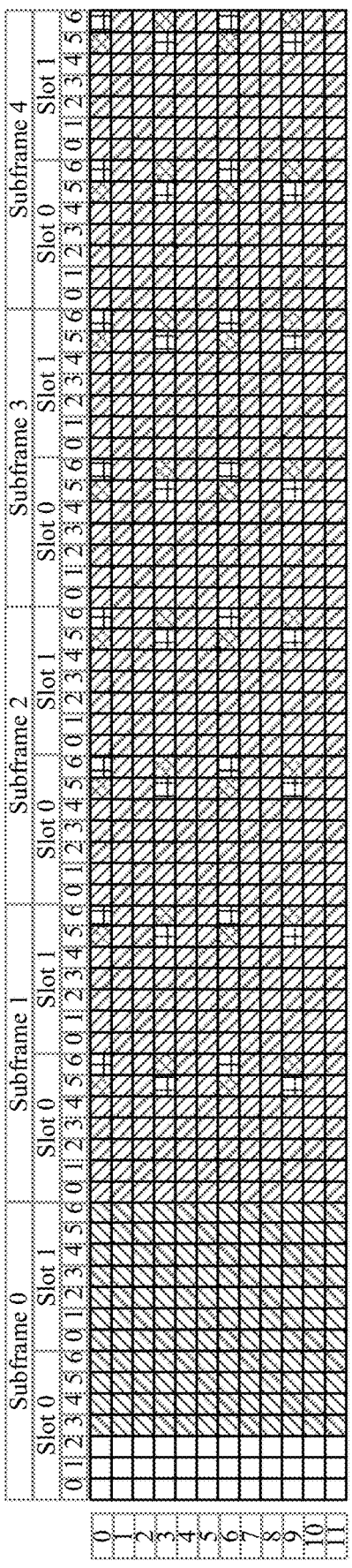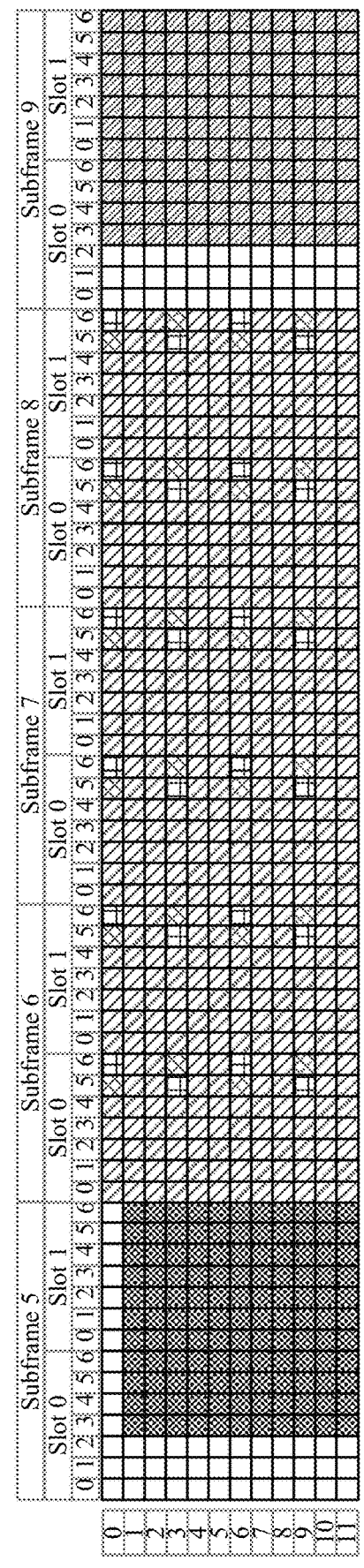
FIG. 2C

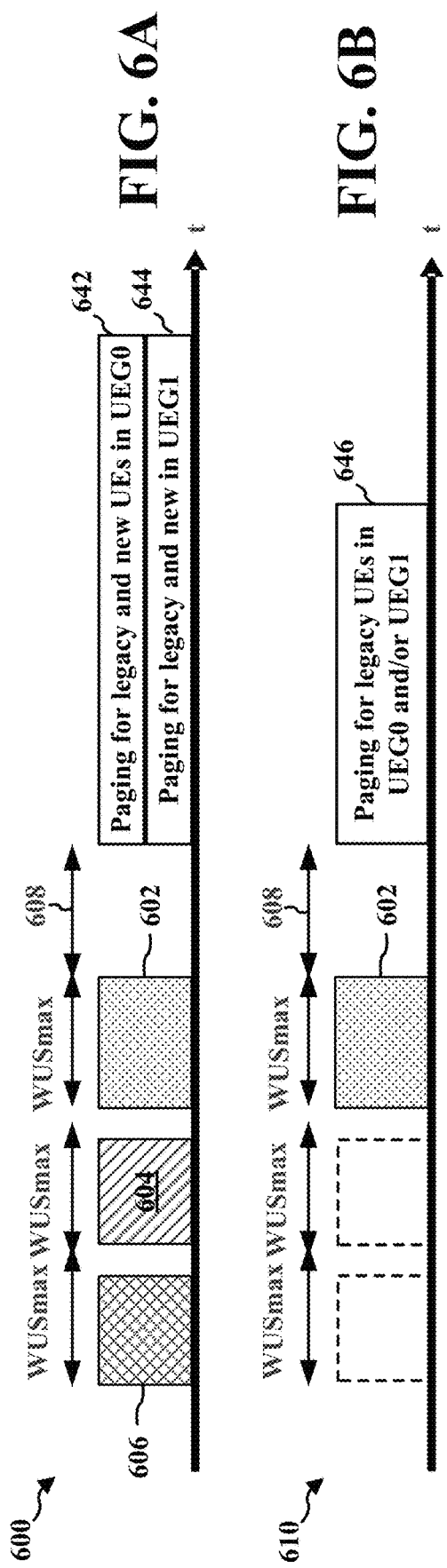
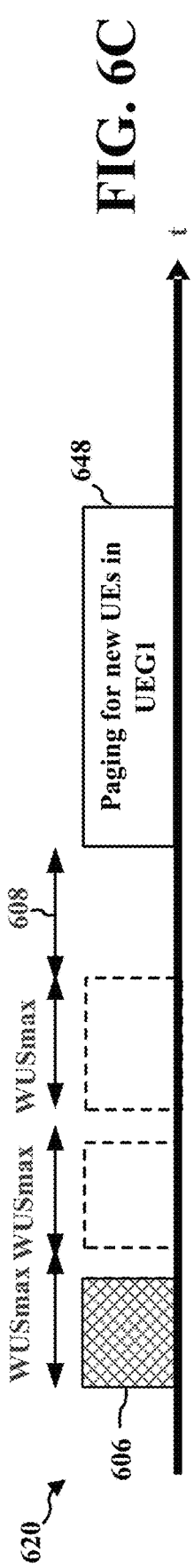
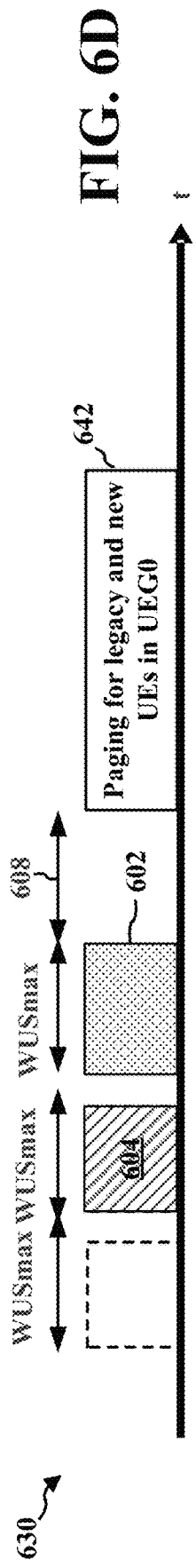

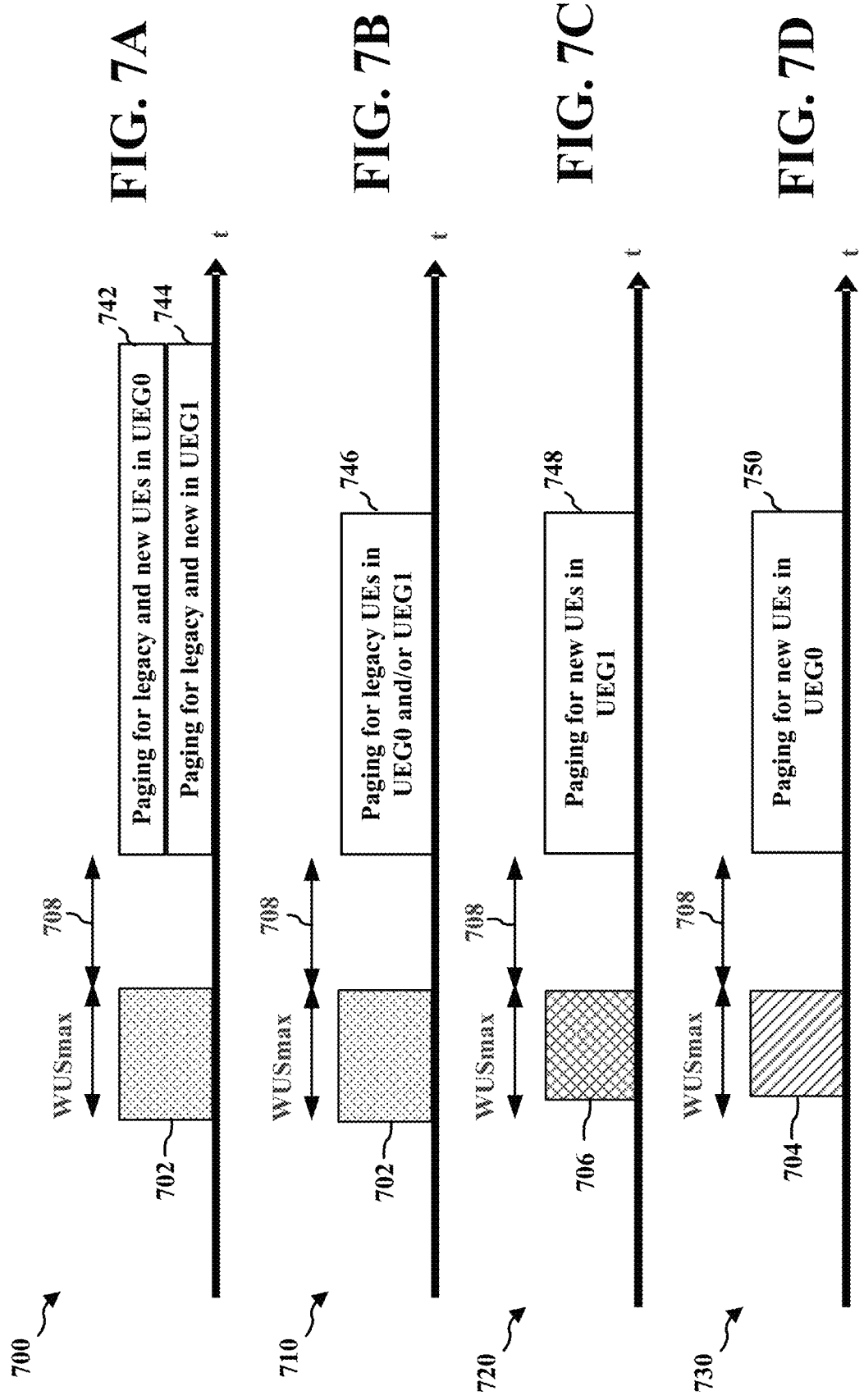

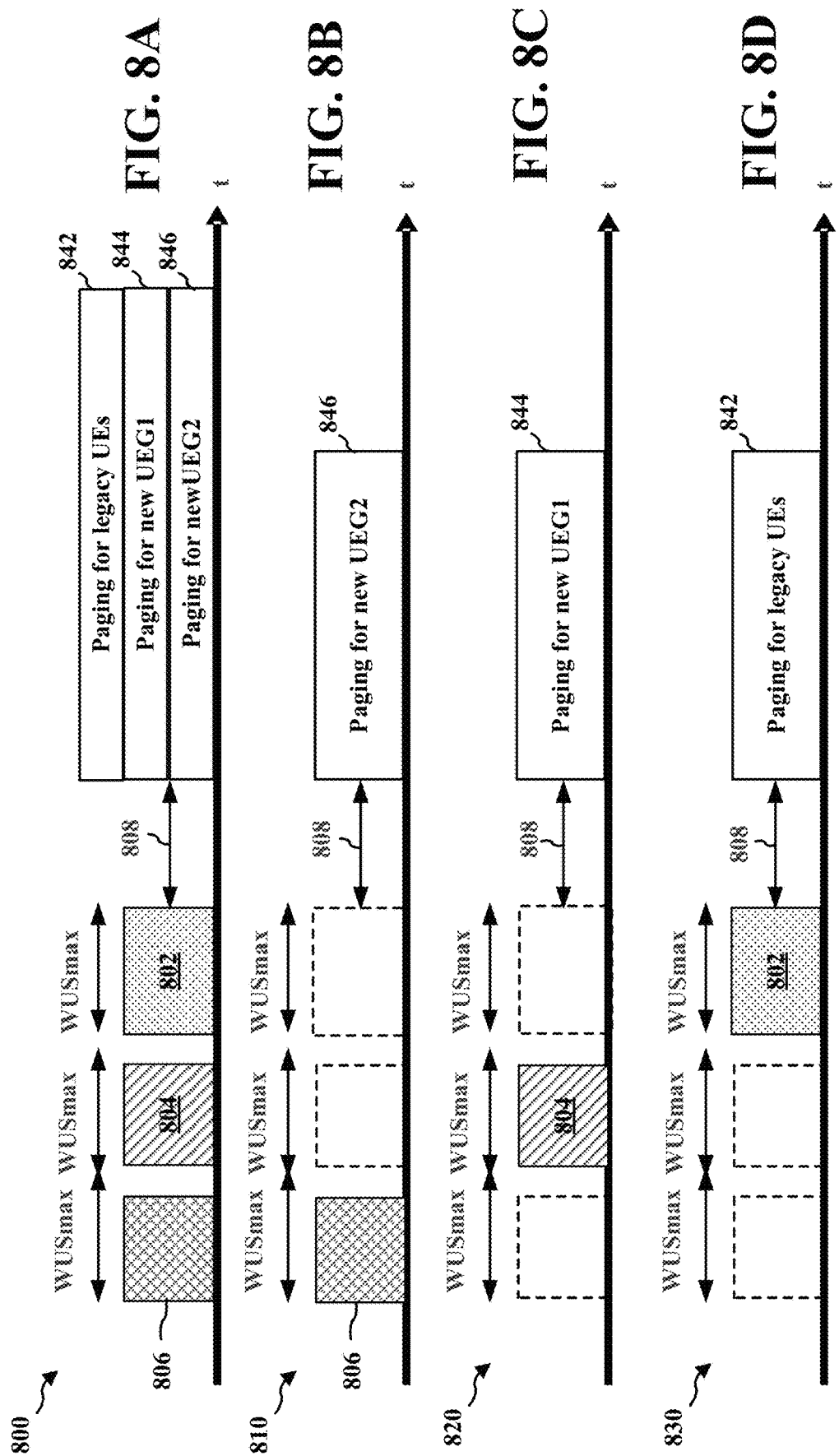

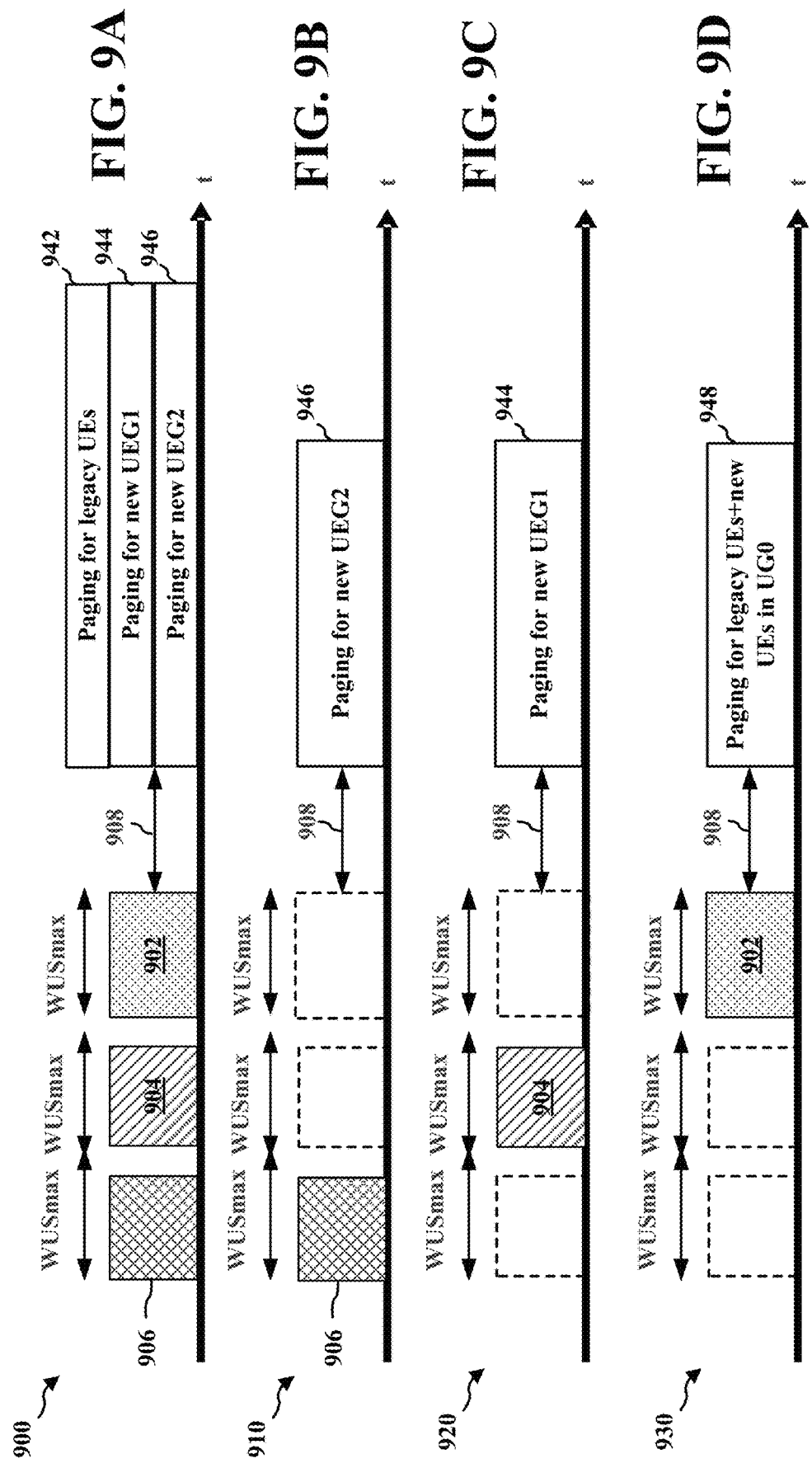

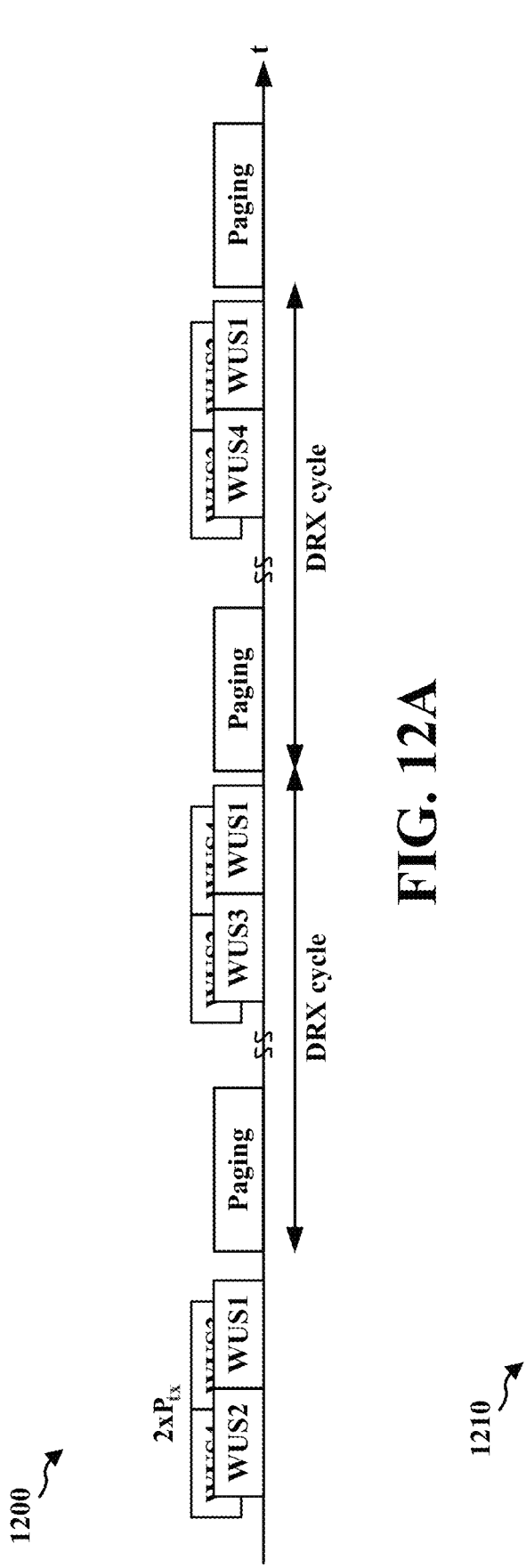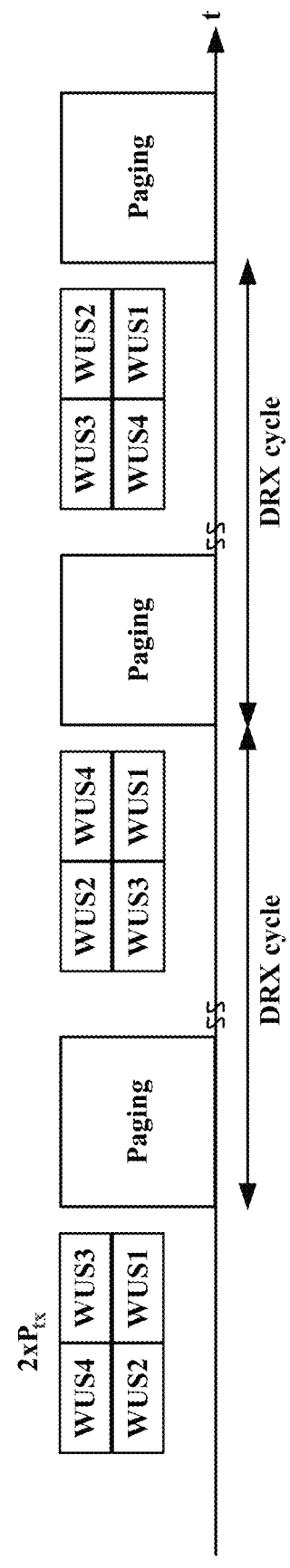
FIG. 12A
FIG. 12B

METHODS AND APPARATUS FOR A GROUP WAKE UP SIGNAL

CROSS REFERENCE TO RELATED APPLICATIONS

This application claims the benefit of U.S. Provisional Application Ser. No. 62/670,690, entitled "UE GROUPING WAKE UP SIGNAL" and filed on May 11, 2018, U.S. Provisional Application Ser. No. 62/717,597, entitled "UE GROUPING WAKE UP SIGNAL" and filed on Aug. 10, 2018, U.S. Provisional Application Ser. No. 62/739,101, entitled "UE GROUPING WAKE UP SIGNAL" and filed on Sep. 28, 2018, and U.S. Provisional Application Ser. No. 62/754,533, entitled "UE GROUPING WAKE UP SIGNAL" and filed on Nov. 1, 2018, each of which is expressly incorporated by reference herein in their entirety.

TECHNICAL FIELD

The present disclosure relates generally to communication systems, and more particularly, to a methods and devices for transmitting and/or receiving improved notification signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, base stations and UEs send different notification and paging signals to each other in order to facilitate communication. These signals can help to improve the overall communication system information, as well as to improve the access and control of each device within the wireless system. In some instances, a wake-up signal (WUS) can be sent from a base station to a UE in order to provide notification of an upcoming paging occasion (PO). When sending and receiving multiple WUSs and POs, it can be beneficial to determine a strategy and/or conserve the amount of WUSs and POs that are sent throughout the wireless system. By doing so, the overall power consumption of the wireless system can be improved.

The present disclosure relates to transmitting and receiving an improved wake-up signal (WUS) by grouping user equipment (UE). A base station can group a plurality of UEs into a plurality of UE groups. The base station can then assign a UE group identification or group WUS sequence to one or more sub-group UEs within a UE group. Next, base station can indicate the UE group identification or group WUS sequence assignment to the UEs. The base station can then determine and transmit a WUS identifying which UEs within the group should wake-up for a paging occasion (PO). Prior to receiving the transmission, the UEs can listen for the WUS. After receiving the WUS, the identified UEs can wake-up before receiving the corresponding PO. Each WUS comprises a certain duration, which cannot exceed a maximum allowed WUS duration. Also, between the end of the WUS and the PO, there is a gap period.

The base station can also determine the total amount of different UE groups, wherein each UE is assigned to a particular group. Within each group, there can be updated or grouping UEs and/or legacy or non-grouping UEs, wherein the updated or grouping UEs are capable of being assigned to a UE group, while the legacy or non-grouping UEs are not capable of being assigned to a UE group. In some aspects, each legacy or non-grouping UE can receive the same WUS, e.g., a legacy WUS, and each updated or grouping UE can receive a WUS that targets the particular group or sub-group for that UE, e.g., a group-specific WUS. The legacy WUS can identify which legacy or non-grouping UEs should wake-up for a non-grouping PO. Likewise, the group-specific WUS can identify which updated or grouping UE should wake-up for a group-specific PO. Moreover, the group-specific WUS and the non-grouping WUS can be staggered and transmitted at different time periods, in addition to being transmitted at the same time.

The base station can also balance the amount of legacy UEs and updated UEs within each group. This balancing can be based on a number of different weighting factors. Also, each legacy WUS and group-specific WUS can be turned on or off as needed, for example to further conserve power. The ability to turn on or off a WUS can be specific to a cell or carrier, depending on the type of UE. Furthermore, the ability to turn WUS grouping on or off can be carrier specific. Also, a Mobility Management Entity (MME) can store the paging capabilities of the UE, which can include whether the UE supports WUS and whether the UE supports grouping.

In an aspect of the disclosure, a method, a computer-readable medium, and an apparatus are provided for wireless communication at a UE for listening for a WUS. The apparatus can receive a UE group identification or group WUS sequence from a base station assigned to one or more sub-group UEs in a UE group, wherein the one or more sub-group UEs can include the UE. The apparatus can also listen for a WUS for the UE group from the base station for the one or more sub-group UEs assigned to the UE group to wake-up for a PO. A WUS starting time offset can be determined based on an implicit or explicit indication from the base station. In some aspects, the WUS for a UE group can be time division multiplexed with at least one other WUS for another UE group or non-group specific WUS. In other aspects, the WUS for the UE group can be code division multiplexed with at least one other WUS for another UE group or non-group specific WUS. In yet other aspects, the WUS for the UE group can be frequency division multiplexed with at least one other WUS for another UE group or non-group specific WUS. Also, a WUS frequency offset for a starting resource block can be determined based on an implicit or explicit indication. The apparatus can also select a paging carrier from a plurality of carriers. Additionally, the apparatus can receive the WUS from the base station for the sub-group UEs, as well as wake up the sub-group UEs for the PO.

In another aspect of the disclosure, a method, a computer-readable medium, and an apparatus are provided for wireless communication at a base station for transmitting a WUS. The apparatus can group a plurality of UEs into a plurality of UE groups. The apparatus can also indicate an assignment to one of the plurality of UE groups to each of the plurality of UEs. The apparatus can balance the amount of grouping UEs and non-grouping UEs in each of the UE groups. A starting time offset of the WUS can be indicated for the UE group. Also, a frequency offset for a starting resource block of the WUS can be indicated based on an implicit indication or an explicit indication. Additionally, the apparatus can transmit the WUS for a UE group from among the plurality of UE groups.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of an NB frame structure for in-band deployment inside an LTE carrier (even radio frame), an NB frame structure for in-band deployment inside an LTE carrier (odd radio frame), an NB frame structure for guard band/stand-alone deployment inside an LTE carrier (even radio frame), and an NB frame structure for guard band/standalone deployment inside an LTE carrier (even radio frame), respectively.

FIGS. 6A-6D are timelines illustrating transmissions between a base station and UEs including WUSs.

FIGS. 7A-7D are timelines illustrating transmissions between a base station and UEs including WUSs.

FIGS. 8A-8D are timelines illustrating transmissions between a base station and UEs including WUSs.

FIGS. 9A-9D are timelines illustrating transmissions between a base station and UEs including WUSs.

FIGS. 12A and 12B illustrate examples of multiplexing according to the present disclosure.

DETAILED DESCRIPTION

Figure 1:
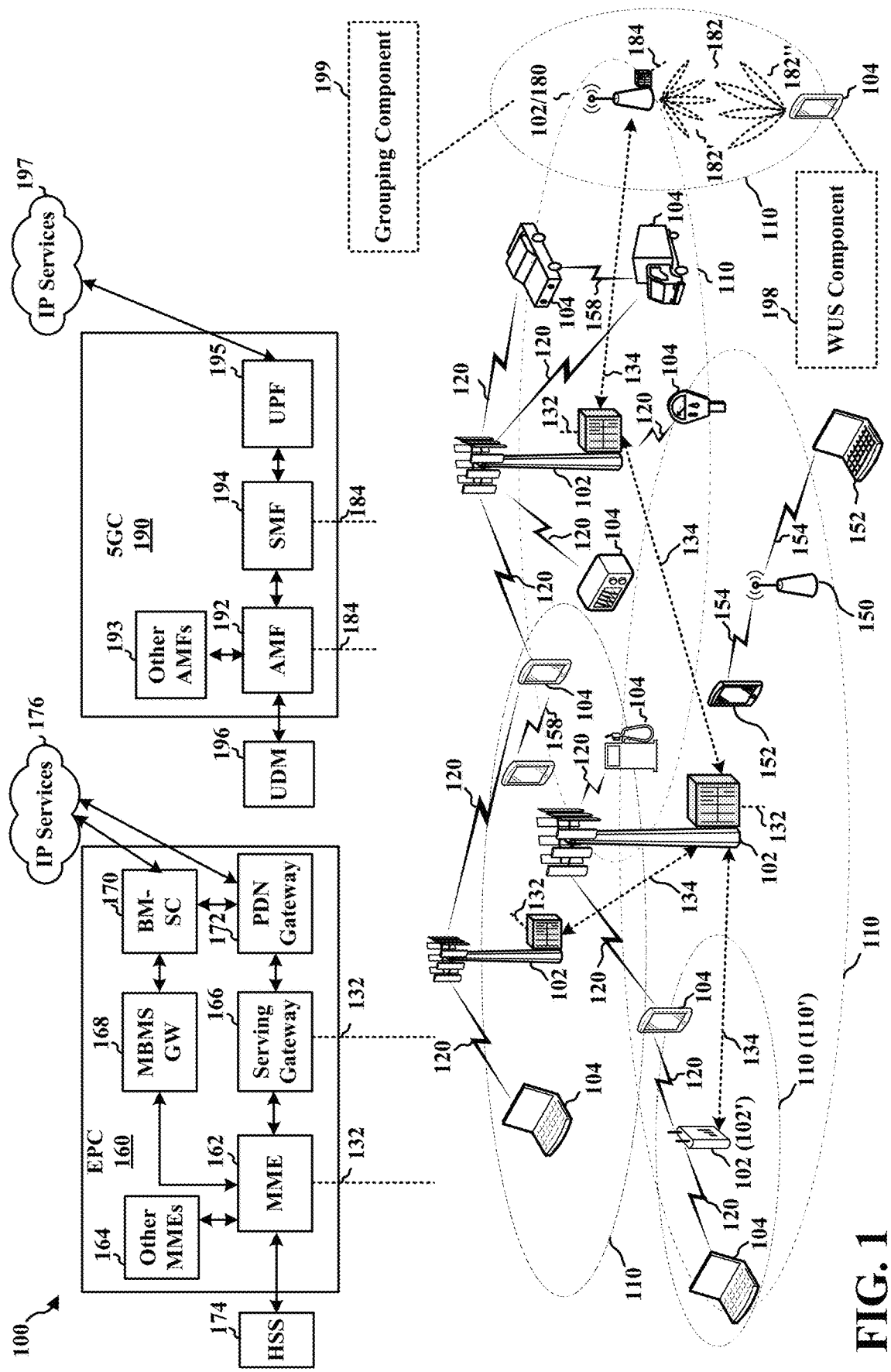
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a core network 190 (e.g., a 5GC). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 104 may include a wake-up signal (WUS) component 198 configured to receive, from a base station, a group WUS sequence assigned to one or more sub-group UEs in a UE group, where the one or more sub-group UEs include the UE. The WUS component 198 may also be configured to listen for a WUS for the UE group from the base station for the one or more sub-group UEs assigned to the UE group to wake-up for a paging occasion (PO). Additionally, the base station 102/180 may include a grouping component 199 configured to group a plurality of UEs into a plurality of UE groups. The grouping component 199 may also be configured to transmit a WUS for a UE group from among the plurality of UE groups. Although the following description may be focused NB-IoT/MTC, the concepts described herein may be applicable to other similar areas, such as 5G NR, LTE, LTE-A, CDMA, GSM, and other wireless technologies.

Figure 2B:
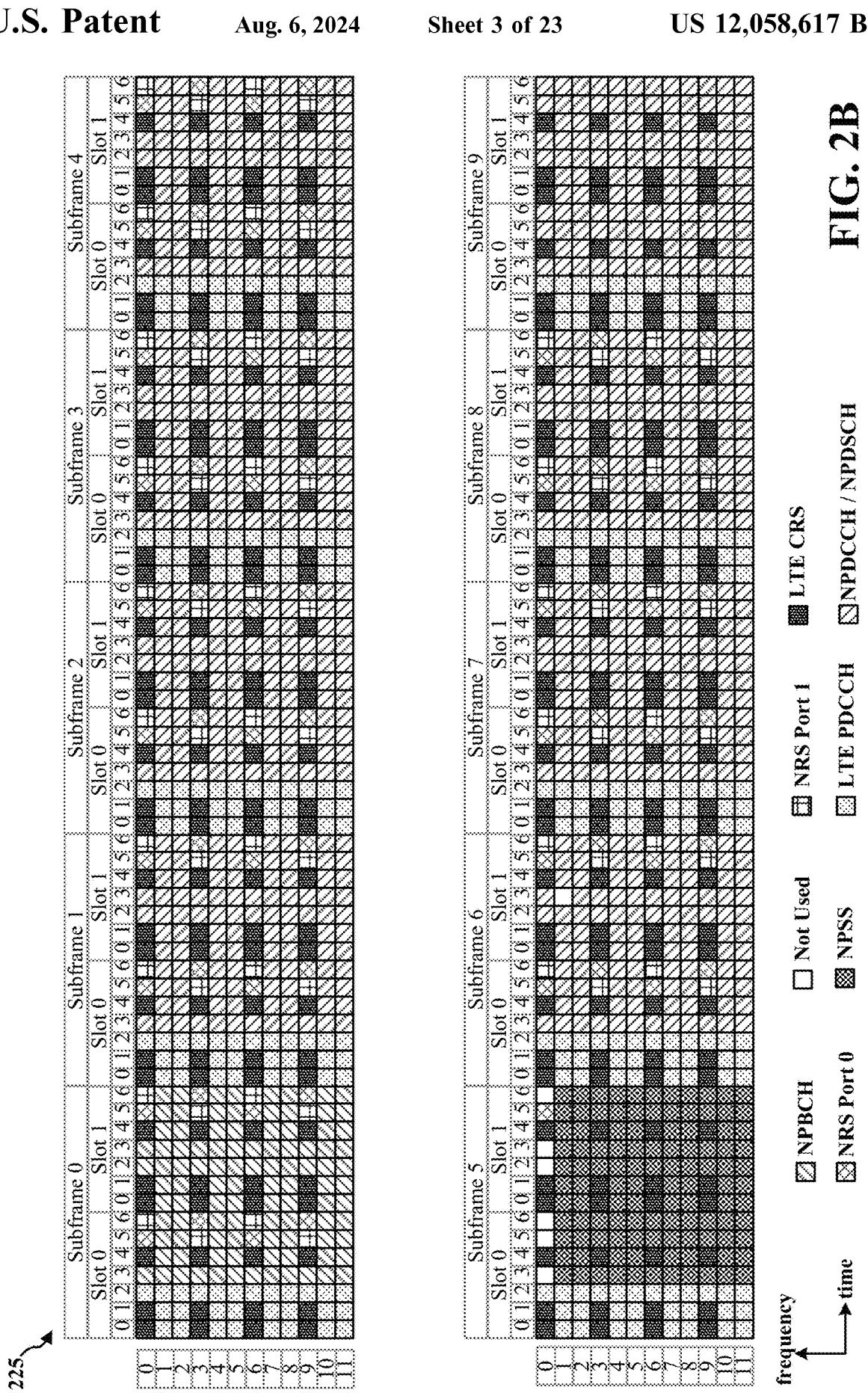
Figure 2D:
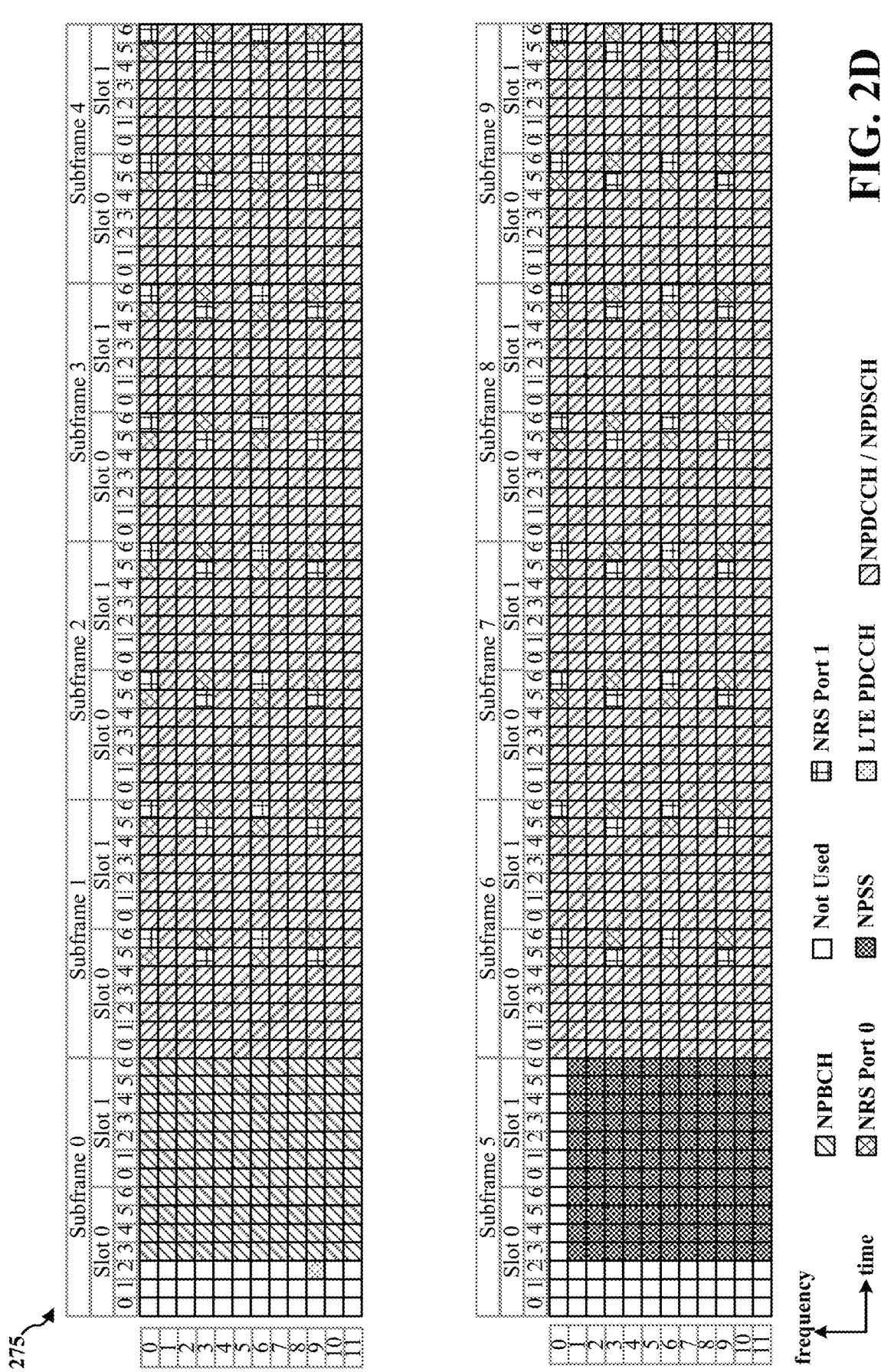

FIG. 2A is a diagram 200 illustrating an example of an NB frame structure for in-band deployment inside an LTE carrier (even radio frame). FIG. 2B is a diagram 225 illustrating an example of an NB frame structure for in-band deployment inside an LTE carrier (odd radio frame). FIG. 2C is a diagram 250 illustrating an example of an NB frame structure for guard band/standalone deployment inside an LTE carrier (even radio frame). FIG. 2D is a diagram 275 illustrating an example of an NB frame structure for guard band/standalone deployment inside an LTE carrier (even radio frame). Other wireless communication technologies may have a different frame structure and/or different channels. A radio frame (10 ms) may be divided into 10 equally sized subframes (e.g., subframe 0-subframe 9). Each subframe may include two consecutive time slots (e.g., slot 0 and slot 1). A resource grid may be used to represent the two time slots, each time slot including one or more time concurrent RBs (also referred to as physical RBs (PRBs)) of 180 kHz. The resource grid is divided into multiple resource elements (REs). For a normal cyclic prefix, an RB may contain 12 consecutive subcarriers in the frequency domain and 7 consecutive symbols (for DL, orthogonal frequency-division multiplexing (OFDM) symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. The in-band deployment of NB-IoT may utilize RBs within an LTE carrier. The guard band deployment of NB-IoT may utilize the unused RBs within an LTE carrier's guard-band. The stand-alone deployment of NB-IoT may utilize RBs within the global system for mobile communications (GSM) carriers.

As illustrated in FIGS. 2A-2D, some of the REs in each of the subframes carry NB reference signals (NRS) that may be used for broadcast transmission(s) or dedicated DL transmission(s), regardless of whether data is actually transmitted. Depending on the transmission scheme, NRS may be transmitted on one antenna port or on two antenna ports (e.g., antenna port 0 and antenna port 1). The values of the NRS may be similar to cell-specific reference signals (CRS) in LTE. NRS may indicate an NB cell identifier (NCellID), while LTE CRS may indicate a physical cell identifier (PCI). For the in-band deployment, the LTE CRS may also be transmitted in subframes which are not used for MBSFN, as illustrated in FIGS. 2A and 2B. Although the structure of the NRS and the LTE CRS may not overlap, the CRS may be taken into account for rate matching and RE mapping purposes. DL transmissions may not use the REs allocated for NRS and/or LTE CRS.

For initial synchronization and in order to determine the NCellID, an NB primary synchronization signal (NPSS) may be transmitted in subframe 5 of even and odd radio frames, and an NB secondary synchronization signal (NSSS) may be transmitted in subframe 9 in even radio frames. Using in-band deployment, the first three OFDM symbols in each of subframe 5 and subframe 9 may carry the LTE physical downlink control channel (PDCCH), and hence, the first three OFDM symbols in subframes 5 and 9 may not carry NPSS and NSSS, as illustrated in FIGS. 2A and 2B. NPSS and the NSSS may be punctured by LTE CRS in the in-band deployment. Using the guard band deployment and/or standalone deployment, the first three OFDM symbols in each of subframe 5 and subframe 9 may be unused, and hence, the first three OFDM symbols in subframes 5 and 9 may not carry the NPSS and NSSS, as illustrated in FIGS. 2C and 2D.

The NB physical broadcast channel (NPBCH) may carry the NB master information block (NB-MIB). After physical layer baseband processing, the resulting NB-MIB may be split into eight blocks. The first block may be transmitted in subframe 0 of each radio frame in a set of eight consecutive radio frames. The second block may be transmitted in subframe 0 of each radio frame in the subsequent set of eight consecutive radio frames. The process of NB-MIB block transmission may be continued until the entire NB-MIB is transmitted. By using subframe 0 for all NB-MIB block transmissions, collisions between the NPBCH and a potential LTE MBSFN transmission may be avoided when the in-band deployment of NB-IoT is used. As illustrated in FIGS. 2A and 2B, NPBCH symbols may be mapped around the NRS and the LTE CRS for the in-band deployment. As illustrated in FIGS. 2C and 2D, the NPBCH may occupy all of subframe 0 except for the first three symbols which are left unused for the guard band deployment and/or standalone deployment.

The principle of a control channel and a shared channel also applies to NB-IoT, defining the NB physical downlink control channel (NPDCCH) and the NB physical downlink shared channel (NPDSCH). Not all subframes may be used for the transmission of dedicated DL channels. In RRC signaling, a bitmap indicating the valid subframes for NPDCCH and/or NPDSCH may be signaled to the UE. When a subframe is not indicated as valid, an NPDCCH and/or NPDSCH may be postponed until the next valid subframe. The NPDCCH may indicate which UEs have data located in the NPDSCH, where to find the data, and how often the data is repeated. UL grants that indicate REs allocated to a UE for UL data transmission(s) may also be located in the NPDCCH. The NPDCCH may also carry paging and/or system information updates. NPDCCH symbols and NPDSCH symbols may be mapped around the NRS, and for the in-band deployment of NB-IoT, also around the LTE CRS.

NB-IoT or MTC may be based on an LTE frame structure. For example, NB-IoT communication may use multiple 1 PRB carriers and may use narrowband RS (NRS) instead of CRS. MTC communication may use 6 PRB narrowbands and may use CRS.

Figure 3:
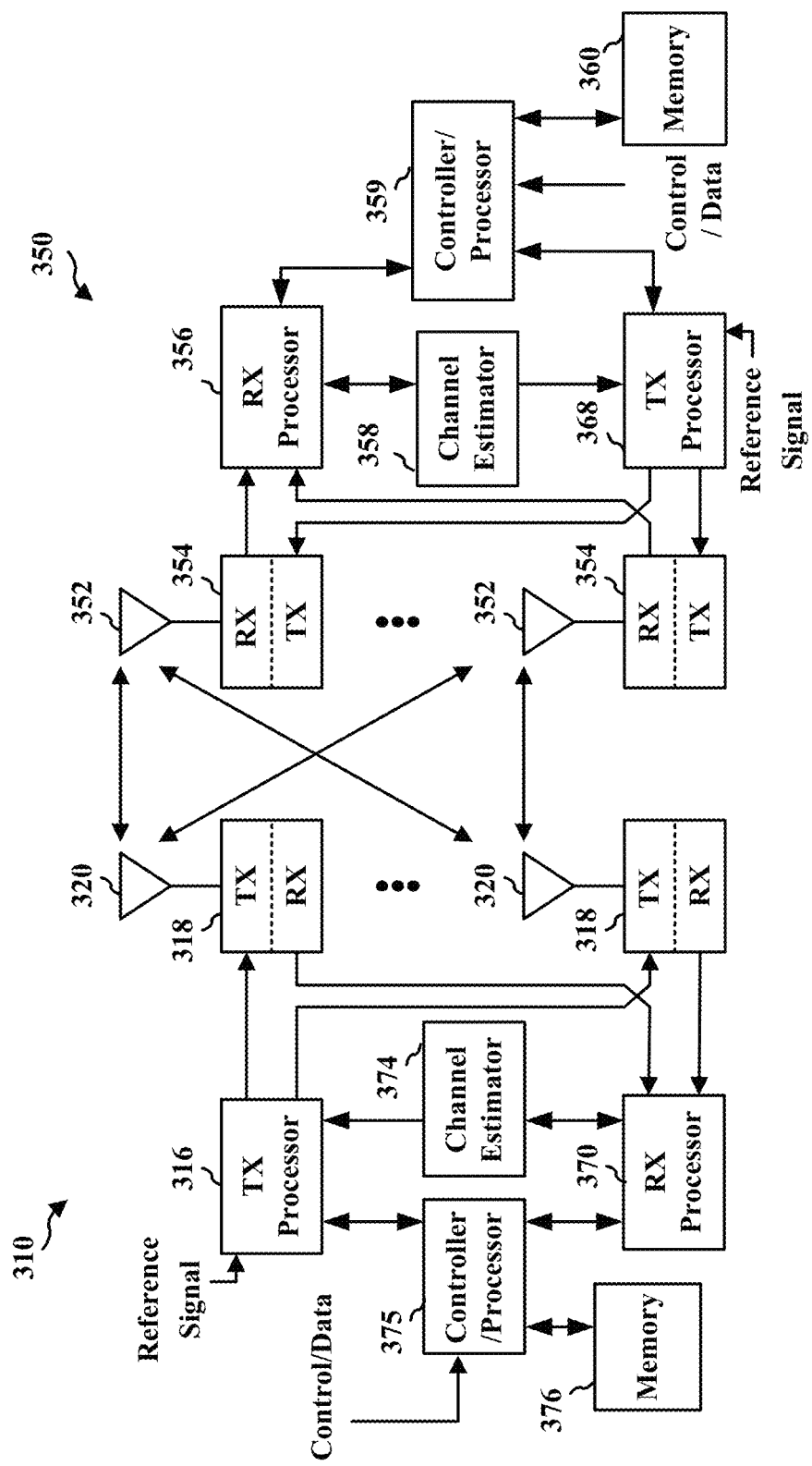
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A UE may be configured by a base station for a discontinuous reception (DRX) mode. When there is no data to be transmitted between the UE and base station in either direction, e.g., no uplink or downlink transmissions, the UE may enter the DRX mode in which the UE may monitor a control channel discontinuously using a sleep and wake cycle. DRX conserves battery power at the UE. Without DRX, the UE would need to monitor the control channel in every subframe to check whether there is data for the UE. Continuous monitoring of the control channel places a demand on the UE's battery power. The base station may send a wake-up signal (WUS) to a UE in advance of a paging occasion (PO) when the base station will transmit communication to the UE. If the UE receives a WUS, the UE may wake-up by preparing to receive the communication during the PO. If the UE does not receive a WUS, the UE may return to the sleep mode.

Different types of wireless communication systems can support different types of WUSs. For instance, some wireless communication systems can support at least a WUS discontinuous transmission (WUS/DTX) at least for paging UEs in radio resource control idle (RRC_IDLE) mode. One example is machine-type communication (MTC) for narrowband (NB) Internet of Things (IoT) (MTC/NB-IoT. In some aspects of the WUS sequence, the WUS can be time-varying from subframe to subframe. The WUS signal can also be designed based on a variety of information, including: cell ID information, UE group ID, time information of the starting subframe of the WUS or PO, and/or part of the system frame number (SFN) information.

As indicated above, WUSs are used to wake-up the UEs, if there is an upcoming corresponding PO. Hence, if there is no upcoming PO, then the WUS is not sent. In this manner, the WUS is based on DTX, meaning it is not always present and may instead be transmitted when needed. As further discussed herein, WUSs can wake-up or alert every UE, certain groups of UEs, individual UEs, or any other combination of UEs within a system.

Figure 4:
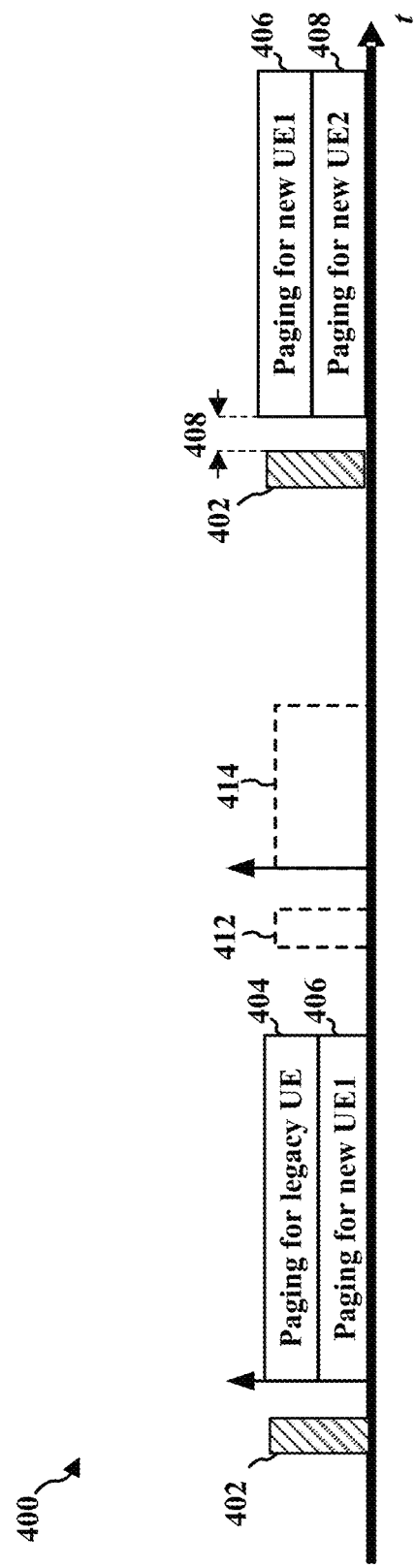
FIG. 4 is a timeline illustrating transmissions between a base station and UEs including a WUS.

FIG. 4 is a timeline 400 illustrating one such WUS transmission between a base station and UEs. FIG. 4 displays legacy WUS 402, PO 404, PO 406, PO 408, gap 410, blank WUS 412, and blank PO 414. As shown in FIG. 4, legacy WUS 402 may be used to notify or alert all UEs of any upcoming associated PO. FIG. 4 shows that in certain transmissions, a single WUS can be used to notify all UEs of an associated PO, e.g., POs 404/406/408. For instance, the WUS 402 notifies the PO for every type of UE, including legacy or non-grouping UEs, as well as new, updated or grouping UEs, e.g., UE1 and UE2. This enables UEs without grouping capability to receive the WUS for the PO. POs 404/406/408 represent that the POs can be sent using stacked paging, which can mean that the certain POs occur at the same time and correspond to a specific WUS transmission. Accordingly, the POs that correspond to a specific WUS can occur simultaneously. Although this approach can simplify the WUS transmission process, it can also increase the power usage, as a WUS needs to be sent to every UE no matter if that UE has an upcoming associated PO. The type of WUS approach does not form the UEs into groups, hence it can be referred to as a WUS without UE grouping. As indicated above, this type of WUS is sent to all UEs when there is an upcoming associated PO. Therefore, all of the UEs will wake up for the PO. Blank WUS 412 and blank PO 414 represent a PO opportunity where a WUS is not sent or does not occur, and the corresponding PO also does not occur. For instance, blank WUS 412 and blank PO 414 represent a PO opportunity without a WUS or PO because there is nothing to transmit.

For other wireless communication systems, the WUSs can be improved or enhanced for the MTC/NB-IoT. These improvements may include the ability to group different UEs for the purpose of sending a WUS. For instance, the base station can configure a particular WUS to apply to a sub-group of UEs. This particular WUS could then alert the sub-group of UEs of the need to wake up for an associated PO. By alerting a sub-group of UEs with a WUS, rather than all of the UEs, this can improve the overall power savings of the system, as only the UEs in the sub-group will wake up for the PO. This allows the remaining UEs to stay in a lower power mode.

These types of systems that allow for grouping UEs and sending associated WUSs may also need to support UEs without grouping ability. A system that is able to support UEs both with and without grouping ability can be referred to as having backward compatibility. UEs with the ability to be grouped can be referred to as new, updated, and/or grouping UEs. UEs without grouping ability can be referred to as legacy, old, and/or non-grouping UEs. A UE that has grouping capability may be configured such that it does not support grouping. Non-grouping UEs may also refer to UEs that do not currently support grouping. However, both grouping and non-grouping UEs can be referred to by any appropriate name. In these types of systems with backward compatibility, the base station can configure the WUS to enable legacy or non-grouping UEs to continue to receive the WUS. As indicated previously, legacy or non-grouping UEs may support WUSs without the ability to identify particular UE groups. Accordingly, any system with backward compatibility may need to send different types of WUSs to alert the grouping and non-grouping UEs. Backward compatible systems can also enable or configure the updated or grouping UEs with their corresponding WUS.

Figure 5:
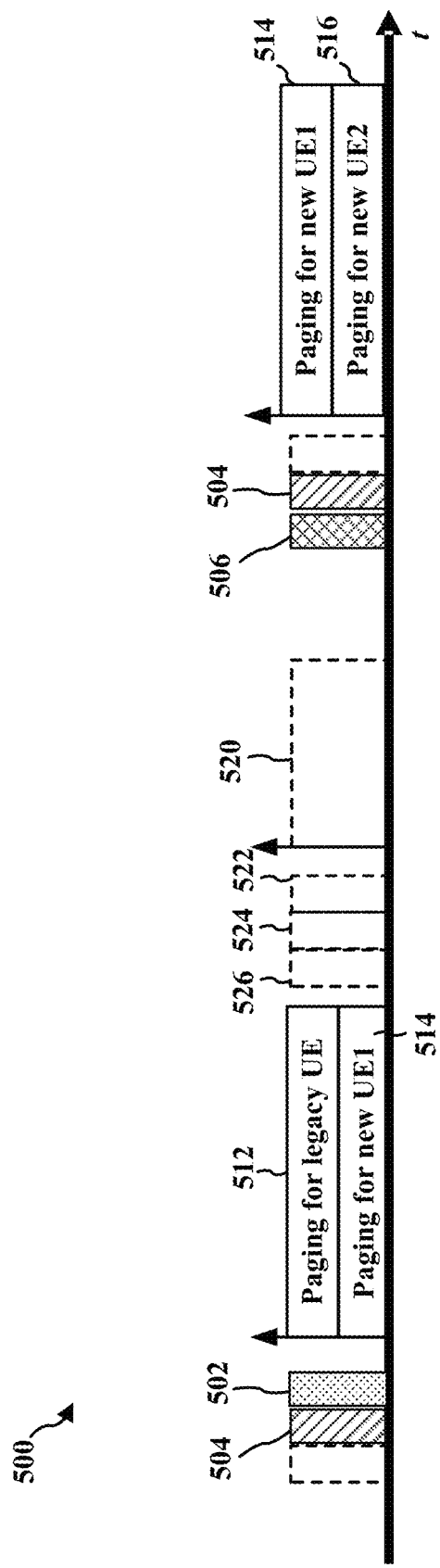
FIG. 5 is a timeline illustrating transmissions between a base station and UEs including WUSs.

FIG. 5 is a timeline 500 illustrating group-specific WUS transmissions. FIG. 5 displays legacy WUS 502, WUS 504, WUS 506, PO 512, PO 514, PO 516, blank PO 520, and blank WUS 522/524/526. For instance, the base station in timeline 500 can transmit a group-specific WUS when the corresponding PO associated with the UE group is forthcoming. FIG. 5 illustrates that for grouping UEs, the base station can configure a group-specific WUS, e.g., WUS 502, WUS, 504, or WUS 506, to target or alert a sub-group of UEs of an upcoming associated PO, e.g., PO 512, PO 514, or PO 516. As mentioned above, POs 512/514/516 can utilize stacked paging. For example, WUS 502 is a legacy WUS to target all UEs, WUS 504 can be a new WUS for a UE group 1, and WUS 506 can be a new WUS for a UE group 2. These group-specific WUSs can be sent, if necessary, meaning they are sent if the paging for an associated UE group is present. If an associated PO is not forthcoming, then the WUS for the corresponding group will not be sent and the UEs in that group can go to sleep or continue sleeping. This is represented by blank WUS 522/524/526 and blank PO 520. These types of group-specific WUSs can also differentiate between different UE groups. Additionally, as shown in FIG. 5, systems comprising group-specific WUSs can have backward compatibility. Indeed, FIG. 5 illustrates that a legacy or non-grouping WUS can be transmitted for all legacy or non-grouping UEs to alert them of an upcoming PO.

The system can configure WUS parameters for UE grouping in a variety of manners. In one aspect, the base station can configure the parameters for a group-specific WUS, which targets a specific group of UEs. For example, the base station can configure or define a number of UE grouping related parameters, including but not limited to: the number of UE groups (G), the UE group identification or group WUS sequence, and/or weighting factors to decide UE groups, UE group identification, or group WUS sequence. The number of UE groups, e.g., G, can target a specific system aspect, such as being cell specific, carrier specific, or narrow band specific. As indicated above, the weighting factors can help decide to which group each UE should belong. Also, the base station can balance the number of UEs within each group. And by sending the WUS to the corresponding UE groups, the base station can help improve the overall power savings of the system.

The group WUS sequence or UE group ID can be defined based on different UE grouping related parameters, or any number of different factors, such as UE identify index value (UE_ID), the number paging frames within a discontinuous reception (DRX) cycle (N), the number of POs within a paging frame (Ns), or the number of paging narrow bands provided in system information (Nn). The UE group ID can also consider how to differentiate between the new or grouping UEs with grouping capability and the legacy or non-grouping UEs without grouping capability. Also, in some aspects, the UE group ID might be known by the grouping UEs that support UE grouping and not known by the legacy UEs. The grouping UE group ID can also depend on a pre-defined equation, wherein the base station and the UE will obtain the UE group ID intrinsically.

The base station can broadcast the number of UE groups, e.g., G, explicitly in the system information block (SIB). For example, the default value of G, the number of UE groups, can be set to 1. For example, if G=1, then there is one group, so the grouping UEs and the legacy UEs are all in the same group. Hence, if G=1, the grouping UEs can monitor or listen for the WUS directed to legacy UEs, the legacy WUS, in a similar manner to how the legacy UEs monitor or listen for the legacy WUS. Additionally, the weighting factors can be broadcast in the SIB. These parameters can be broadcast widely to reach the idle or sleeping UEs.

It is noted that the aforementioned WUS based on UE grouping can be an optional feature. Accordingly, the group-specific WUSs, which target or alert UEs with grouping capability, can be turned on or off by the base station. If there is no signaling for group-specific WUSs, then UEs can simply use the default mode, e.g., G=1, and monitor for the legacy WUS as a legacy UE.

It is also noted that each WUS can have a certain duration or length. In some aspects, the duration of group-specific WUSs can be similar to the duration of legacy WUSs. FIG. 5 illustrates the legacy WUS having the same duration as the WUS for UE group 1 and the WUS for UE group 2. The maximum WUS duration (WUSmax) for each group-specific WUS can also be the same as that of the legacy WUS. The actual WUS duration can be smaller than WUSmax and aligned with its configured starting point. Thus, no matter the duration of a specific WUS, it can be aligned with the same starting point, i.e., the starting subframe relative to the associated PO. The starting point for a PO can be equal to the corresponding WUS plus the gap between the WUS and the PO. It is also noted that the valid subframes, e.g., the valid subframes are the NB-IoT DL subframes, or subframes not carrying non-BL/CE subframes and SIB 1 for MTC, might be counted for the WUSmax and the actual WUS duration.

As mentioned above, there can be a gap maintained between the end of the WUS duration and the associated PO, which can be referred to as a gap period, gap length, or any appropriate term. FIG. 4 illustrates an example gap between a legacy WUS and the associated PO. Gaps should satisfy the minimum required UE processing time, which could be based on UE capability. In some aspects, certain gaps can be equal to or larger than the legacy gap between the end of the legacy WUS and the associated PO. Along these lines, the UE group-specific gaps can be larger than the legacy gap. For example, if time division multiplexing (TDM) is being used, the group-specific WUS can be sent prior to the legacy WUS, so that the gap between the group-specific WUS and the PO will be larger than the gap between the non-grouping WUS and the PO. If frequency division multiplexing (FDM) is being used, the group-specific WUS can be sent at the same starting time as the legacy WUS, so that the gap between the end of the group-specific max WUS duration and the PO will be equal to the gap between the end of non-grouping max WUS duration and the PO. It is noted that both the valid and invalid subframes can be counted for the gap.

For grouping UEs and the corresponding group-specific WUSs, there can be resource allocation. This can be one of the differences between the non-grouping UEs and grouping UEs, as there may not be resource allocation with non-grouping UEs. The non-grouping UEs may not be aware of the grouping UEs and corresponding groups, so this resource allocation may not affect them. If time division multiplexing (TDM) is being used, the WUS time starting time offset can be explicitly or implicitly indicated. For instance, if the group-specific WUS for the UE group is time division multiplexed with at least one other WUS for another UE group, then the starting time offset of the group-specific WUS for the UE group can be based on an implicit indication or an explicit indication received from the base station. In some aspects, the WUS for a UE group can be time division multiplexed with at least one other WUS for another UE group or non-group specific WUS. In other aspects, the WUS for the UE group can be code division multiplexed with at least one other WUS for another UE group or non-group specific WUS. In yet other aspects, the WUS for the UE group can be frequency division multiplexed with at least one other WUS for another UE group or non-group specific WUS. If frequency division multiplexing (FDM) is being used, e.g., for MTC, the frequency starting resource block (RB) offset per group-specific WUS can be explicitly or implicitly indicated, e.g., by an equation. More specifically, if the group-specific WUS for the UE group is frequency division multiplexed with at least one other WUS for another UE group, then the frequency offset for a starting RB of the group-specific WUS for the UE group can be based on an implicit indication or an explicit indication received from the base station. These TDM and FDM options can be configured by the base station or can be predefined in different carriers/bands/systems, e.g., TDM is used for NB-IoT carrier and FDM is used for MTC narrowbands.

FIGS. 6A-6D are timelines 600, 610, 620, and 630, respectively, which display transmissions between a base station and different UEs including different WUSs. FIGS. 6A-6D display legacy WUS 602, WUS 604, WUS 606, and gap 608. WUS 602 can be for legacy UEs, WUS 604 can be for UEs in UE group 0, and WUS 606 can be for UEs in UE group 1. For instance, FIGS. 6A-6D display that there can be a variety of different ways to configure the different options and parameters for the WUS transmission. FIGS. 6A-6D display that in some aspects, all UEs, whether grouping or non-grouping, can be placed in different UE groups. In some of these aspects, the new or grouping UEs can be equally distributed per UE group. For instance, if G>1, wherein G is the number of UE groups, all UEs can be divided into G groups and each group can includes grouping UEs and legacy UEs. In some aspects, WUS 604 can be for UEs in group 0 when G>1 and WUS 606 can be for UEs in group 1 when G>1. FIGS. 6A-6D display an example when G=2. As indicated previously, if G=1, then the system can return to the a non-grouping mode, wherein there is a single non-grouping WUS for all UEs. FIGS. 6A-6D illustrate that for grouping UEs, the base station can configure a group-specific WUS, e.g., WUS 602, WUS, 604, or WUS 606, to target or alert a sub-group of UEs of an upcoming associated PO, e.g., PO 642, PO 644, PO 646, or PO 648. As mentioned above, POs 642/644/646/648 can utilize stacked paging.

In some aspects, the group WUS sequence or UE group identification (UE_Group_ID), often represented by g, can be decided based on an equation. For example, UE_Group_ID: g=floor(UE_ID/(N*Ns*Nn))mod G. As indicated above, this equation accounts for the UE identify index value (UE_ID), the number paging frames within a DRX cycle (N), the number of POs within a paging frame (Ns), and the number of carriers or NBs that support WUS UE grouping (Nn).

In examples such as FIGS. 6A-6D, the legacy or non-grouping UEs may not be aware of the UE grouping and thus may monitor the legacy WUS, as in the legacy mode. As indicated previously, the legacy WUS can be transmitted when there is a PO for legacy UEs in any one of the UE groups. Further, no matter what group the legacy UEs are in, when a legacy WUS is sent, all the legacy UEs can wake-up for the legacy PO. Grouping UEs may monitor the WUS for their UE group, rather than the legacy WUS. Grouping UEs have their own specific WUS according to their assigned group or sub-group, which can be referred to as a group-specific WUS. This enables the grouping UEs to remain in a sleep mode unless a group-specific WUS is transmitted while maintaining the ability of the non-grouping UEs to receive the non-grouping WUS.

As shown in FIGS. 6A-6D, if G=2, the grouping UEs can be assigned to both group 0 and group 1, which each have a respective WUS. Accordingly, if a PO will be sent for grouping UEs in group 0, then the WUS corresponding to group 0 will be sent and notify the grouping UEs in group 0 to wake-up for the PO. Likewise, the WUS assigned to grouping UEs in group 1 will be sent if the grouping UEs in group 1 need to wake-up for a PO. As in other modes, the legacy or non-grouping UEs may monitor for the legacy WUS. As discussed above and illustrated in FIGS. 6A-6D, POs can be sent using stacked paging, which can mean that the certain POs occur at the same time and correspond to a specific WUS transmission, e.g., WUS 602/604/606. Accordingly, the POs that correspond to a specific WUS can occur simultaneously.

The WUSs for grouping UEs in different groups can be sent at different times than the WUSs for other grouping UEs. As indicated in FIGS. 6A-6D, there can be an offset for the WUSs assigned to each group, as well as the legacy WUS. For instance, the WUS for UE groups 0 and 1 can be sent before the legacy UEs, such that there is an offset for each of these WUSs. If a WUS is not sent for a certain group of UEs, then those corresponding UEs will not wake-up or stay asleep. As mentioned, supra, this can help with power savings.

Resources can also be allocated for the different WUSs. For instance, the UE-group-specific WUSs can allocate resources according to an equation. For example, if G>1, then the g-th UE-group-specific WUS can have the starting time offset according to: (PO−gap−(g+1)*WUSmax), wherein with g={0, . . . G−1}.

As displayed in FIGS. 7A-7D, further aspects can include both grouping and non-grouping UEs being placed in different UE groups. Thus, the groups may include grouping and non-grouping UEs. In some of these aspects, the grouping UEs can be equally distributed per UE group. As indicated above, if G>1, all UEs can be divided into G groups, wherein each group can include both grouping UEs and legacy UEs. As further mentioned herein, the group WUS sequence or UE group identification (UE_Group_ID), often represented by g, can be decided based on an equation. For example, UE_Group_ID: g=floor(UE_ID/(N*Ns*Nn)) mod G. Once again, the non-grouping UEs are not aware of UE grouping and monitor for the legacy WUS, and the legacy WUS is transmitted when there is a PO for a non-grouping UE in any one of the UE groups.

Grouping UEs can monitor two separate WUS sequences, e.g., the WUS for their particular UE group and the legacy WUS. For instance, when the PO targets the grouping UEs in one UE group, then the corresponding group-specific WUS can be transmitted. In other aspects, when the paging targets more than one UE group or a non-grouping UE, the legacy WUS may be transmitted. Grouping UEs can also detect the legacy/non-grouping WUS. While this may increase the complexity for the grouping UEs, the additional overhead can be allocated from the base station. In some aspects, all grouping UEs can wake up when any WUS is sent, whether grouping WUS or legacy WUS. In other aspects, all UEs can wake-up at the same time when any WUS is sent.

As indicated by timelines 700, 710, 720, and 730 in FIGS. 7A-7D, respectively, different WUSs can also be sent at the same time and/or have the same starting period. FIGS. 7A-7D display legacy WUS 702, WUS 704, WUS 706, and gap 708. WUS 702 can be for legacy UEs, WUS 704 can be for UEs in UE group 0, and WUS 706 can be for UEs in UE group 1. For example, the WUS for the grouping UEs and the legacy UEs can be sent at the same starting point, because one WUS will be sent, either one group specific WUS or the non-group specific WUS, e.g., legacy WUS. The duration length for each of the WUSs can be less than or equal to the maximum WUS duration, WUSmax. Also, the gap periods between each WUS and each corresponding PO can be similar in length. FIGS. 7A-7D illustrate that for grouping UEs, the base station can configure a group-specific WUS, e.g., WUS 702, WUS, 704, or WUS 706, to target or alert a sub-group of UEs of an upcoming associated PO, e.g., PO 742, PO 744, PO 746, PO 748, or PO 750. As mentioned above, POs 742/744/746/748/750 can utilize stacked paging, which can mean that the certain POs occur at the same time and correspond to a specific WUS transmission, e.g., WUS 702/704/706. Thus, the POs that correspond to a specific WUS can occur simultaneously.

Similar to FIGS. 6A-6D, FIGS. 7A-7D display that if G=2, the grouping UEs can be assigned to both group 0 and group 1 with a respective WUS. If a PO will be sent for grouping UEs in group 0 or group 1, then the WUS corresponding to group 0 or group 1 will be sent and notify the grouping UEs in group 0 or group 1 to wake-up for the PO. As in other modes, the legacy or non-grouping UEs can monitor for the legacy WUS.

In FIGS. 7A-7D, resources can also be allocated for the different UE-group-specific WUSs according to an equation. For example, if G>1, then the UE-group-specific WUS can have the same starting offset as the legacy WUS. This can be represented by the equation: starting point=PO−gap−WUS-max, which can also be indicated by simply WUSmax+gap.

In another aspect, the grouping UEs may be placed in groups separate from the legacy or non-grouping UEs. For instance the legacy UEs can be grouped into their own separate group, and the grouping UEs may be grouped into the remaining groups. FIGS. 8A-8D are timelines 800, 810, 820, 830, respectively, illustrating one such example of this configuration. This may enable the non-grouping UEs to be handled separately from the grouping UEs, particularly because the non-grouping UEs do not have the capability to monitor the WUSs of the grouping UEs. For example, if the amount of UE groups exceeds one, G>1, then the legacy UEs can be contained in the first UE group and grouping UEs can be divided into the remaining (G−1) groups. As indicated previously, if G=1, then the system can operate in legacy mode.

The grouping UEs can be distributed amongst the remaining groups according to a formula. One example of a formula is UE_Group_ID: g=floor(UE_ID/(N*Ns*Nn))mod (G−1), wherein each of the components of the formula has been identified, supra. Legacy UEs do not need to be distributed according to a formula, as they are isolated in the first group. As mentioned above, legacy UEs can monitor legacy WUS, which is transmitted when there is paging occasion for the legacy UEs, hence the legacy UEs do not wake-up due to paging of grouping UEs. Because the grouping UEs monitor the WUS for their respective UE group, it can ease the system configuration by placing them is groups separate from the first group, which is reserved for the legacy UEs. And because the legacy UEs are not woken up when on-legacy WUSs, by placing them in a separate group, this can further help with power savings. This type of configuration can be a good option for systems with lots of legacy UEs, as they will all be isolated in one group.

As displayed in FIGS. 8A-8D, the configuration above can work well when the number of groups is three (G=3). FIGS. 8A-8D display legacy WUS 802, WUS 804, WUS 806, and gap 808. WUS 802 can be for legacy UEs, WUS 804 can be for UEs in UE group 1, and WUS 806 can be for UEs in UE group 2. Timelines 800, 810, 820, and 830 in FIGS. 8A-8D, respectively, illustrate that the grouping UEs can be distributed in groups 1 and 2, while the legacy UEs can be isolated in group 0. In one aspect, the WUS for group 2 can be transmitted first, the WUS for group 1 can be transmitted next, and the legacy WUS can be transmitted last. Accordingly, in this configuration, the each WUS is sent at a different time period. As indicated above, all of these WUSs can be less than or equal to WUSmax. Moreover, a gap period can be present before the PO for each respective groups of UEs. FIGS. 8A-8D illustrate that for grouping UEs, the base station can configure a group-specific WUS, e.g., WUS 802, WUS, 804, or WUS 806, to target or alert a sub-group of UEs of an upcoming associated PO, e.g., PO 842, PO 844, or PO 846. As mentioned above, POs 842/844/846 can utilize stacked paging, which can mean that the certain POs occur at the same time and correspond to a specific WUS transmission, e.g., WUS 802/804/806. Thus, the POs that correspond to a specific WUS can occur simultaneously.

As with the aforementioned configurations, the configuration in FIGS. 8A-8D can also allocate resources for the different WUSs. Similar to other configurations, the UE-group-specific WUSs can allocate resources according to an equation. For example, if G>1, then the g-th UE-group-specific WUS can have the starting time offset according to: (PO−gap−(1+g)*WUSmax), wherein with g={0, 1, . . . , G−1}.

FIGS. 9A-9D are timelines 900, 910, 920, 930, respectively, illustrating a further configuration for WUS transmissions. FIGS. 9A-9D display legacy WUS 902, WUS 904, WUS 906, and gap 908. WUS 902 can be for legacy UEs, WUS 904 can be for UEs in UE group 1, and WUS 906 can be for UEs in UE group 2. For example, the configurations in FIGS. 9A-9D can group some grouping UEs together with legacy UEs in the first group. This grouping may be helpful as non-grouping UEs become less prevalent. The remaining grouping UEs can be distributed amongst the remaining UE groups. As will be further discussed, supra, this configuration can introduce one or more weighting factors per UE group to decide or calculate the UE group ID for each respective group. In the configurations shown in FIGS. 9A-9D, if the number of UE groups is greater than one (G>1), some grouping UEs can be placed into the first UE group along with the legacy UEs. As in previous configurations, the remaining grouping UEs can be divided into the remaining (G−1) UE groups. FIGS. 9A-9D illustrate that for grouping UEs, the base station can configure a group-specific WUS, e.g., WUS 902, WUS, 904, or WUS 906, to target or alert a sub-group of UEs of an upcoming associated PO, e.g., PO 942, PO 944, PO 946, or PO 948. As mentioned above, POs 942/944/946/948 can utilize stacked paging, which can mean that the certain POs occur at the same time and correspond to a specific WUS transmission, e.g., WUS 902/904/906. Therefore, the POs that correspond to a specific WUS can occur simultaneously.

In this configuration, the legacy WUS is transmitted when there is a paging occasion for legacy UEs and the grouping UEs within the first group. As in previous configurations, the legacy UEs can monitor the legacy WUS. However, the grouping UEs in the first UE group also monitor the legacy WUS. The remaining grouping UEs monitor the WUS for their respective UE groups. Similar to other configurations, the UE-group-specific WUSs in FIGS. 9A-9D can allocate resources according to an equation. For instance, if G>1, then the g-th UE-group-specific WUS can have the starting time offset according to: (PO−gap−(1+g)*WUSmax), wherein with g={0, 1, . . . , G−1}.

The configurations in FIGS. 9A-9D can also introduce one or more weighting factors to determine the UE group ID for each respective group and balance the number of UEs. One reason to do this is to balance the number of UEs in each group. In one aspect, for UEs supporting WUS with UE grouping, and if the WUS configuration for UE grouping is provided in the SIB, then the UE group ID can be determined by an equation. For example, the UE group ID can be determined by the group with smallest index g, wherein 0≤g≤G−1 that fulfills the following equation: floor(UE_ID/(N*Ns*Nn))mod WG<WG(0)+WG(1)+ . . . + WG(g), where WG(i) is the weighting factor, or the weight for the i-th WUS UE group for grouping UEs, i=0, . . . , g, wherein g=0, . . . (G−1), and WG is the total weight of all UE groups, i.e., WG=WG(0)+WG(1)+ . . . +WG(G−1).

Assuming X of UEs are legacy UEs and (1−X) of UEs are grouping UEs, then (WG(0)/WG) grouping UEs can be in the first (g=0) UE group and $W_G(g)/W_G$ grouping UEs in the g-th UE group. For example, if X=¼, i.e., 25% legacy UEs and 75% grouping UEs, and the number of groups is G=2, then $W_G=W_G(0)$ $W_G(1)=1+2=3$. Thus, $W_G(0)/W_G=⅓$, which is the amount of grouping UEs together with X legacy UEs in the g=0 UE group. The fraction of UEs in the first group is: ⅓(1−X)+X=½. The remaining ⅔ grouping UEs are in g=1 UE group, and the fraction of UEs in the second group is: ⅔(1−X)=½

As another example, if X=⅙ legacy UEs, and G=3, then $W_G(0)=1$, $W_G(1)=2$, $W_G(2)=2$, such that $W_G=5$. And $W_G(0)/W_G=⅕$ grouping UEs together with the legacy UEs in the g=0 UE group. So the fraction of UEs in the first group is: ⅕(1−X)+X=⅓. Remaining ⅖ grouping UEs are in the g=1 UE group, which calculate to ⅖(1−X)=⅓ fraction of UEs in the second group. Finally, there is another ⅖ grouping UEs in g=2 UE group, such that ⅖(1−X)=⅓ fraction of UEs in the third group. As indicated above, this calculation is a way to balance the legacy UEs. Gradually, there are fewer and fewer legacy UEs in the system.

In another aspect of the present disclosure, the system can comprise carrier-specific WUSs. For example, in NB-IoT, there can be multiple carriers configured for paging. In MTC, there can be multiple narrowbands (NBs) configured for paging. But in the legacy WUS mode configuration, turning the WUS on or off (WUS on-off) is cell-specific. For grouping UEs, the WUS on-off can be carrier-specific for NB-IoT or NB-specific for MTC. If carrier-specific or NB-specific, it may be beneficial to change the way a UE selects its paging carrier or NB based on, for example, whether the UE supports WUSs. If the UE can support WUS, then the UE can select the carrier and achieve the corresponding power savings. This can help the base station balance the paging and the WUS load from the base station side.

In one example, WUSs may be enabled in carriers {1,2,3,4}, but not in carriers {5,0}. UEs that do not support WUSs can choose between carriers {0-5}. UEs that support WUSs can choose between carriers {1-4}. Also, the base station should indicate the on/off for different carriers In another example, for instance a WUS-dedicated carrier, the WUS-only carriers may be{1,2}, and the non-WUS carriers may be {0,3}. In this case, the WUS enabled UEs can choose between carriers {1,2}, and the non-WUS UEs can choose between carriers {0,3}.

Furthermore, turning the WUS grouping on or off (WUS grouping on/off) can be carrier-specific for NB-IoT or NB-specific for MTC. If carrier-specific or NB-specific WUS grouping on/off, it may be beneficial to change the way a UE selects its paging carrier based on, for example, whether the UE supports WUS and/or group-WUS.

In another example, WUS may be enabled in carriers {0-5}, and group WUS may be enabled in carriers {2,3}. Here, WUS UEs that do not support grouping choose between carriers {0-5}, while WUS UEs that support grouping choose between carriers {2,3}. Carrier-specific or NB-specific WUS UE group configuration may be further enabled, for example, by the number of UE groups per carrier, which can be indicated in the SIB.

The present disclosure can also provide further details on MME/base station configuration of the groups and WUS. For all the techniques and configuration explained herein, the base station should know whether the UE supports group-WUS or not. One way to enable this is that the MME stores the paging radio capabilities of the UE, which includes whether the UE supports WUS, and, if so, whether the UE supports group WUS. This can imply that, when connecting to network, the UE reports this capability to the MME. The MME also contains the information for the idle UEs.

The above configuration can result in the following: If the MME indicates the UE does not support group WUS, then regardless of whether the base station signals support of group WUS or not, the UE and base station operate in legacy mode. If the MME indicates the UE supports group WUS, and the base station does not signal support of group WUS, then the UE and base station operate in legacy mode. Yet if the MME indicates the UE supports group WUS and the base station signals support/configuration of group WUS, then the UE and base station operate according to the UE grouping configurations mentioned above.

Aspects of the present disclosure can also group UEs in a number of different manners corresponding to the associated WUSs. In some aspects, UEs can be grouped together based on a configured gap size between a WUS and the associated PO. For example, UEs can be grouped based on the gap size between a WUS and the associated PO. In other aspects, for WUSs associated with a certain gap size, a base station can configure a number of UE groups. Other parameters associated with WUS groups or gap-specific WUS groups and corresponding UEs can be configured independently. In other aspects, base stations may adjust the number of WUS groups for each configured gap size and may adjust the WUS maximum duration and actual duration for each WUS group, e.g., through power boosting and/or transmit diversity schemes.

In some aspects, WUSs in certain types of wireless communications, e.g., MTC and NB-IoT, may have different types or sizes of associated gaps. For instance, the base station can provide the different types or sizes of gaps. In some aspects, for the same associated PO, base stations can send multiple WUSs, e.g., because there are different types or sizes of associated gaps. The ability of the base station to group the UEs based on gap size may depend on the type of UEs and/or the reported UE capability. WUSs associated with different types of reception, e.g., DRX or enhanced DRX (eDRX), can comprises different sizes of corresponding gaps. For example, a WUS associated with DRX can correspond to a short gap of 40 ms, 80 ms, 160 ms, or 240 ms. In some instances, WUSs associated with eDRX can correspond to gaps equal to or larger than the gaps corresponding to DRX. For example, a WUS associated with eDRX can also correspond to a short gap of 40 ms, 80 ms, 160 ms, or 240 ms. In yet other aspects, a WUS associated with eDRX can correspond to a long gap of 1 second or 2 seconds. For DRX UEs, an example default required processing time may be 40 ms. For eDRX UEs, the UE may use different receiver architectures for WUS or paging detection with different levels of power saving, which may require a processing time. The eDRX UE can report, e.g., at 40 ms, 240 ms, 1 second, or 2 seconds, for WUS configuration. Based on the reported UE processing time or a UE desired gap, base stations may configure multiple WUSs with different gaps for UEs belonging to the same associated PO.

In other aspects, UEs may be grouped by WUS and configured based on the gap size. For instance, UEs with same configured gap size may be grouped together and divided into subgroups. As such, in some aspects, if UEs may be grouped together and monitor the same WUS with the same gap size between the WUS and the associated PO.

Figure 10:
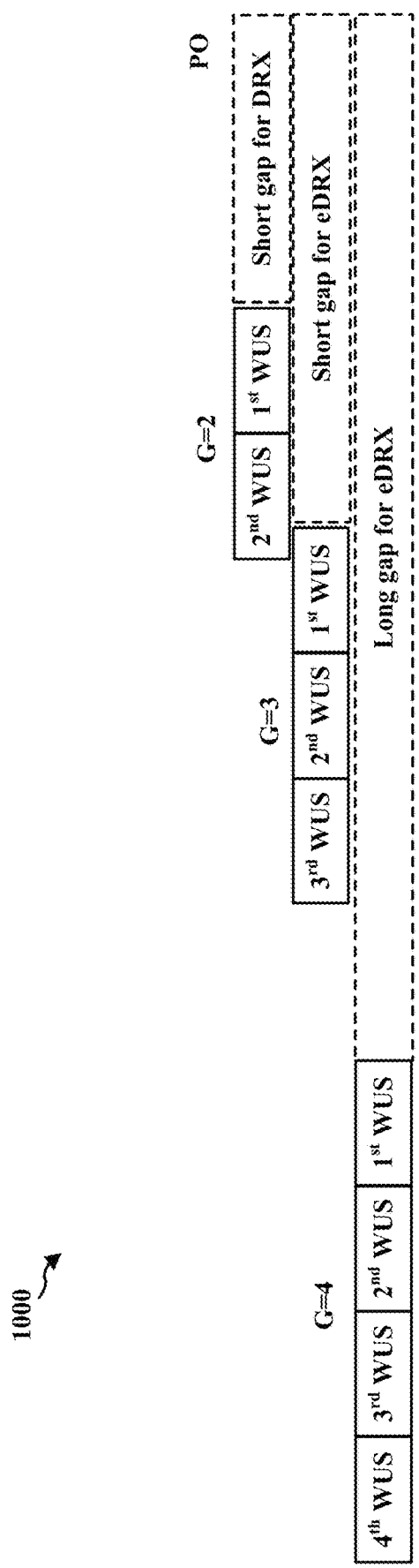
FIG. 10 illustrates one aspect of UE grouping according to the present disclosure.

FIG. 10 illustrates one aspect of a UE grouping 1000 according to the present disclosure. As displayed in FIG. 10, UEs can be grouped based on associated WUS and corresponding gap size. FIG. 10 displays that for a DRX with a short gap size, there can be G=2 UE-group WUSs and each UE in the g-th WUS group, e.g., g=0, . . . , G-1, can have the same gap size between the end of the g-th WUS and the PO, wherein G is the number of UE groups. The G WUS groups with same type of short gap for DRX, e.g., gap DRX, may be multiplexed by TDM and a g-th WUS group may be configured with a starting time offset equal to PO−(gap_DRX)−(g−1)WUSmax. The equivalent gap between the g-th WUS and PO can be equal to or larger than the configured gap for DRX, e.g., gap_DRX+(g−1)WUSmax, where WUSmax is the maximum duration of WUS for each g-th group. FIG. 10 also displays that for a short gap in eDRX, there can be G=3 UE-group WUSs and each UE in the g-th WUS group, e.g., g=0, . . . , G-1, can have the same gap size between the end of the g-th WUS and the PO. The G WUS groups with same type of short gap for eDRX, e.g., gap1_eDRX, may be multiplexed by TDM and a g-th WUS group may be configured with a starting time offset equal to PO−(gap1_eDRX)−(g−1)WUSmax and the equivalent gap between the g-th WUS and the PO can be equal to or larger than the configured gap for DRX, e.g., gap1_eDRX+(g−1)WUSmax, where WUSmax is the maximum duration of WUS for each g-th group. FIG. 10 further displays that for a longer gap in eDRX, there can be G=4 UE-group WUSs and each UE in the g-th WUS group, e.g., g=0, . . . G-1, can have the same gap size between the end of the g-th WUS and the PO. The G WUS groups with same type of long gap for eDRX, e.g., gap2_eDRX, may be multiplexed by TDM and a g-th WUS group may be configured with a starting time offset equal to PO−(gap2_eDRX)−(g−1)WUSmax and the equivalent gap between the g-th WUS and PO may be equal to or larger than the configured gap for DRX, e.g., gap2_eDRX+(g−1)WUSmax, where WUSmax is the maximum duration of WUS for each g-th group. Note that WUSmax can be same or different for different types of gaps. In some aspects, grouping the UEs according to WUSs with a similar gap size can be referred to as gap-specific WUS grouping. In other aspects, for UEs with different WUSs or different gap sizes, the UEs cannot be grouped together.

In other aspects, for UEs corresponding to WUSs with same size of gaps, the communication may be broadcasted in a SIB and the WUSs can have different starting time offsets or WUS max/actual durations. In aspects with a more flexible configuration, base stations can configure different the number of UE groups, G, for different sizes of gaps. The present disclosure can also include different percentages of UEs corresponding to DRX or eDRX. Accordingly, depending on the number of UEs using DRX or eDRX, a base station can divide them differently. It may be more flexible for the base station to divide the UEs based on the types of gap size. Additionally, the number of UE groups may be same or different based on the corresponding configured gap size. Other parameters associated with UEs, e.g., the maximum or actual WUS duration or the power boost, can be the same or different based on the corresponding configured gap size.

In yet other aspects, if there are multiple WUSs for the same associated PO, and if a corresponding base station allows multiple group WUS with different gap sizes, then there may be some WUS overlap. If a base station sends a different WUS for the same PO, the WUSs should avoid overlapping one another.

There can be several options available to a base station to avoid WUS overlapping. In one example, the base station may configure a separate distance of different gaps and/or a limited number of UE groups and/or different power boosting techniques to avoid overlapping amongst WUSs corresponding to a UE group with different gap sizes. In one aspect, the shorter gap size for the eDRX (e.g., gap1_eDRX) may be larger than the short gaps for the DRX (e.g., gap_DRX) so that it may be possible to configure a number of UE-group WUSs for the DRX UEs with gap_DRX. In another aspect, the long gap size for eDRX (e.g., gap2_eDRX) may be larger than the short gap size for the eDRX (e.g., gap1_eDRX) so that it may be possible to configure a number of UE-group WUSs for the eDRX UEs with gap1_DRX. Base stations according to the present disclosure can also use power boosting or transmit diversity to configure a number of UE-group WUSs with shorter WUS max/actual duration for the DRX to fit within a time period, e.g., gap1_eDRX-gap_DRX, as well as configure a number of UE-group WUSs with shorter WUS max/actual duration for the eDRX to fit within another time period, e.g., gap2_eDRX-gap1_eDRX, to avoid overlapping.

In another example, a base station may allow overlapping of UE group WUSs. In the example of overlapping UE-group WUSs, the base station may utilize power boosting in the overlapped region of UE-group WUSs and each WUS may still have similar or even larger power as that of a non-overlapped region. Additionally, different sequences may be utilized for different UE-group WUSs so that each UE group may identify the correct WUS, even when there is interference from another WUS for a different UE group overlapping the WUS. In these aspects, allowing some type of WUS overlap can result in the configurations being more flexible.

Figure 11A:
FIGS. 11A-11C illustrate examples of multiplexing according to the present disclosure.
Figure 11B:
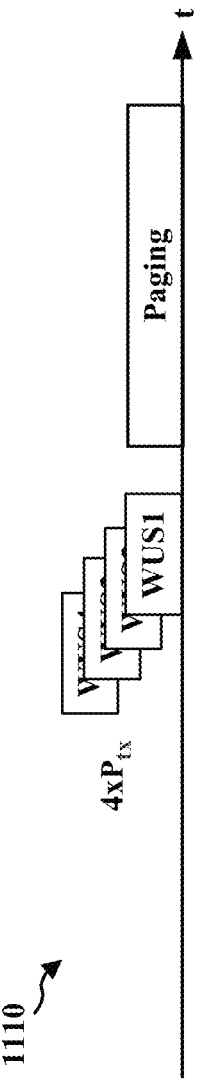
Figure 11C:
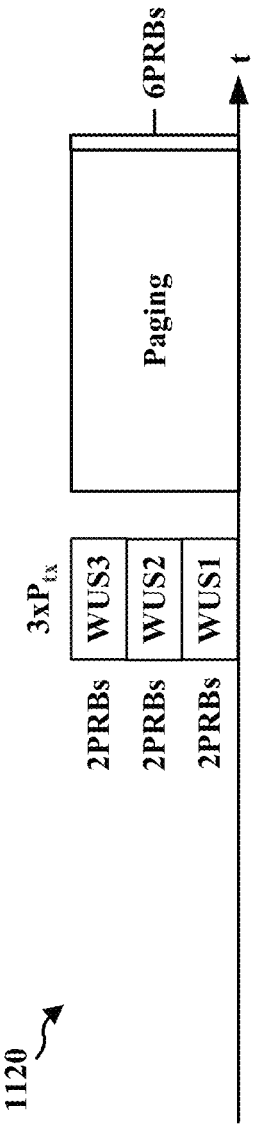

FIGS. 11A-11C illustrate examples 1100, 1110, and 1120, respectively, of multiplexing according to the present disclosure. FIGS. 11A-11C each display an example of time division multiplexing (TDM), code division multiplexing (CDM), and frequency division multiplexing (FDM) for UE group WUS. More specifically, FIG. 11A shows an example 1100 of TDM WUS, e.g., for MTC and/or NB-IoT. FIG. 11B displays an example 1110 of CDM WUS, e.g., for MTC and/or NB-IoT. Also, FIG. 11C shows an example 1120 of FDM WUS, e.g., for MTC. For UE group WUS multiplexing, using TDM, CDM, and/or FDM can have a number of different advantages and disadvantages. For example, TDM may not have power sharing and have no impact on the legacy WUS, e.g., WUS1 as shown in FIG. 11A. Also, TDM may have more overhead for a larger number of groups, and a larger gap between the end of a UE group and a PO, and may use more power. Regarding the use of CDM, there may be no additional overhead if the transmission power is boosted. Further, there may be a common gap with same latency as the legacy WUS, e.g., WUS1 in FIG. 11B. The use of CDM may need a boost in power to maintain the same length, and there can be a possible impact on the legacy WUS, e.g., WUS1, from multiplexed WUSs. Concerning the use of FDM, there may be no impact on the legacy WUS, e.g., WUS1 in FIG. 11C. Moreover, there may be a common gap with the same latency as the legacy WUS. There may be a need to boost the power in order to keep the same length when using FDM. Another possible design is to use a common WUS to wake up all the UEs, including non-grouped UEs, e.g., legacy UEs and grouped UEs, when there is paging for the legacy UE, or for the UEs belonging to different groups. Otherwise, the UE-group WUS may be sent instead of the common WUS in the same allocated resources. The UE-group WUS and common WUS may not be sent at the same time, which may not depend on power sharing or overhead/latency. However, one issue may be a sacrifice in the power saving gain. The legacy WUS may wake up all other UEs, even if there are only 1% legacy UEs in the system. The paging of new UEs can also provide a negative impact on the legacy UE power saving as well.

FIGS. 12A and 12B illustrate examples 1200 and 1210, respectively, of multiplexing according to the present disclosure. For instance, FIGS. 12A and 12B display that the present disclosure can utilize combined multiplexing schemes, e.g., TDM, FDM, and/or CDM, with no or minimized additional signaling. In some aspects, the present disclosure can use TDM for X number of UE-group WUSs and the remaining (G-X) UE-group WUSs may use CDM or FDM to multiplex on top of the TDMed WUSs. Alternatively, the present disclosure can use CDM or FDM for X UE-group WUSs and the remaining (G-X) UE-group WUSs can use TDM to multiplex with the CDMed or FDMed UE-groups WUSs. Here, G, wherein G={2,3,4, . . . }, is the number of UE-group WUSs, which may be configured and broadcasted in SIB, and X, wherein 2≤X≤G, may be pre-defined or configured by SIB.

FIG. 12A displays an example 1200 which utilizes TDM for two UE groups and CDM for another two UE groups, while boosting the power by 3 dB. FIG. 12B displays an example 1210 which utilizes TDM for two UE groups and FDM for another two UE groups, while also boosting the power by 3 dB. Accordingly, FIG. 12A shows an example in which TDM and CDM are combined, and FIG. 12B shows an example wherein TDM and FDM are combined. In other aspects, the present disclosure can configure more than two WUS groups by adding another multiplexing scheme. For instance, the present disclosure can select one multiplexing scheme when the number of groups is limited to a threshold value. However, if the number of groups exceeds the threshold value, then another multiplexing scheme can be added. In one example, the present disclosure can use CDM when configuring two groups, and can add TDM to CDM when configuring more than two groups. In some aspects, the present disclosure can utilize combined multiplexing schemes, TDM/CDM/FDM and/or the scheme to select one WUS among common WUS and UE-specific WUSs, with no or minimized additional signaling. For example, the present disclosure can use TDM or CDM or FDM for a small G, e.g., G=2, but choose the scheme of a common WUS or UE-specific WUS for a large G, e.g., G=4.

In another aspect, the present disclosure can change the index order of UE group WUSs for different POs, such by using a predefined cyclic shift. This can be done to average the latency for different UE groups when waiting for the PO. For instance, if the WUS is relatively far from the PO, then there will be an increased latency, which uses power because the WUS may stay awake and not go into sleep mode. This gap between the PO can be larger than other WUS groups, which can use increased power compared to WUS groups closer to the PO. In one aspect, the present disclosure can use an index to change the WUS group order, such that the PO gap can be averaged. For instance, the present disclosure can use a predefined cyclic shift to change the index order. Accordingly, the present disclosure can adjust the order of WUS groups to save power by averaging the latency for each group. However, in some aspects, the legacy WUS, e.g., WUS1 in FIG. 12B, may not change its ordering.

For example, in FIG. 12B, WUS1 and WUS3 start closer to the PO, so their PO gap is smaller than WUS2 and WUS4. However, the order can be changed to make WUS4 closer to the PO, and then WUS2 closer to the PO. By changing the order, the average total latency for non-legacy WUS groups, e.g., WUS2, WUS3, and WUS4, can be similar. As such, each non-legacy WUS group can have the same opportunity to be close to the PO, so the latencies can be the similar and the groups can use the same amount of power. By doing so, the present disclosure can change the index order of the WUS groups, except for the legacy group. Further, this approach may not add any additional signaling. However, other aspects can also use a higher level of signaling, e.g., broadcast. Additionally, yet other aspects can predefine a pattern for the WUS group index changes. The pattern for the WUS group index may be determined by the timing of POs, e.g., a PO subframe index modified by a DRX cycle, so that the UE can implicitly know the resources for the UE-group WUS of its UE group index for each PO.

Figure 13:
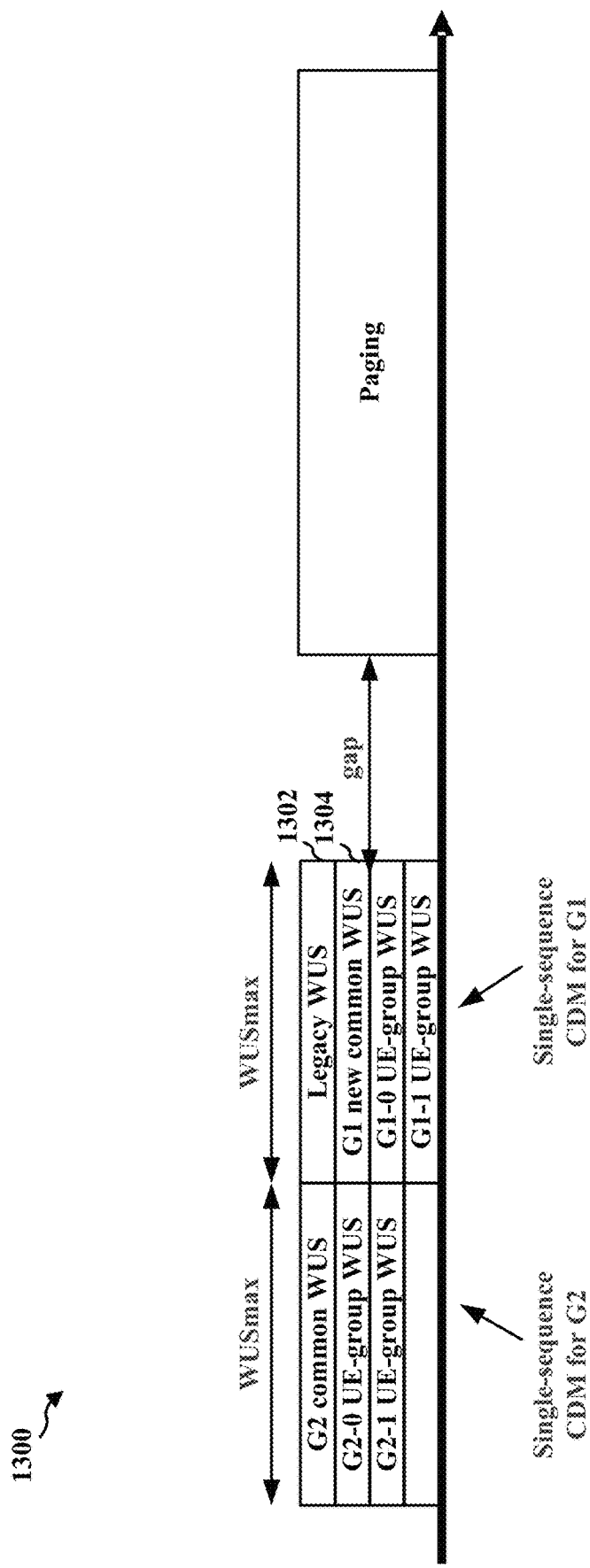
FIG. 13 is a timeline illustrating transmissions between a base station and UEs including WUSs.

FIG. 13 is a timeline 1300 illustrating transmissions between a base station and UEs including WUSs. More specifically, FIG. 13 displays a multiplexing scheme for NB-IoT or MTC UEs using the same configured gap. The configured gap can be one of the following gaps: a DRX gap for DRX UEs, an eDRX short gap for eDRX UEs, or an eDRX long gap for eDRX UEs. In some aspects of the present disclosure, multiplexing schemes for legacy or UE-group WUS can be TDM and/or single-sequence CDM, where TDM includes different WUSs using different time-domain resources and single-sequence CDM includes different sequences sharing the same resource and one sequence is transmitted at a given time. As mentioned previously, legacy UEs may detect a legacy WUS. Further, legacy UEs can be unaware of a UE-group WUS. In one aspect, a legacy WUS can have a starting point equal to: PO−gap−WUSmax, where the gap is the gap configured by a base station for the WUS associated with the PO and WUSmax is the configured maximum duration of the WUS.

As shown in FIG. 13, in some aspects, all new or grouping UEs may belong to one of two groups, e.g., G1 and G2. The UEs may be further grouped into sub-groups within G1 and G2. Other UEs might not be capable of being grouped, which can be referred to as legacy UEs. Thus, the WUS configuration may need to be signaled in a manner that addresses the needs/capabilities of different UEs. Among the UEs that are capable of being grouped, e.g., "grouping UEs," a portion of grouping UEs may be mapped to G1 (e.g., new UE1) can have a number of different capabilities, such as detecting a G1 non-group specific WUS (e.g., a legacy WUS), detecting a G1 common WUS (e.g., a common WUS that can be detected by UEs capable of grouping in G1) if configured, and detecting a G1 sub-group WUS. The remaining grouping UEs may be mapped to G2 (e.g., new UE2) and can detect a G2 common WUS (e.g., a common WUS that can be detected by UEs capable of grouping in G2) and detect a G2 sub-group WUS. FIG. 13 illustrates example WUSs that may be transmitted for two groups of UEs, e.g., G1 and G2. Within G1 and G2, the UEs that are capable of being grouped may be further grouped into subgroups, e.g., subgroups G1−0 and G1−1 and subgroups G2−0 and G2−1. Each group can share the resources for different WUS sequences but a single sequence may be transmitted at a given time, i.e., use single-sequence CDM for WUS multiplexing.

In one aspect, the G1 non-group specific WUS (e.g., legacy WUS) 1302 can be sent when at least one legacy UE or more than one G1 subgroup UE needs to be paged. UEs that belong to G1 can detect the G1 non-group specific WUS 1302. Also, a particular G1 sub-group WUS (e.g., G1−0 UE-group WUS or G1−1 UE-group WUS) may be sent when the grouping UE(s) from that subgroup (e.g., G1−0 or G1−1) needs to be paged. In another aspect, the non-group specific WUS 1302 can be sent when at least one legacy UE needs to be paged. Also, the G1 common WUS 1304 can be used when UEs from more than one G1 subgroup need to be paged, but no legacy UE needs to be paged. Moreover, a particular G1 UE-group WUS (e.g., G1−0 UE-group WUS or G1−1 UE-group WUS) can be sent when the grouping UE(s) from that subgroup (e.g., G1−0 or G1−1) needs to be paged. The difference between the above aspects can be the introduction of the G1 common WUS that should be detected by the new or grouping UEs in G1, but not for legacy UEs. Also, the present disclosure can continue to send a non-group specific WUS when at least a legacy UE needs to wake-up. The legacy UEs will not be woken up if new UEs in G1 are paged, i.e., G1 common WUS or G1 UE-group WUS will be transmitted. In this way, it can reduce the impact on the legacy UEs by paging new UEs.

Similar to the grouping of UEs into group G1, other grouping capable UEs may be grouped in to G2 and may be further grouped into subgroups G2−0, G2−1, etc. The configuration for G2 may be unknown by any legacy UEs. In some aspects, the legacy UEs may not detect the WUS sequences for G2 group. Therefore, the WUS used to wake-up UEs within G2 may comprise a common WUS for grouping UEs and sub-group WUSs (e.g., G2−0 UE-group WUS or G2−1 UE-group WUS). In one aspect, a G2 common WUS can be sent when UEs from more than one G2 subgroup need to be paged. A corresponding G2 UE-group WUS can be sent when UE(s) from one subgroup (e.g., G2−0 or G2−1) need to be paged. Further, G2 may use newly configured resources orthogonal with that of a legacy WUS, e.g., TDM. The present disclosure can also consider how to group the UE1 and UE2 UEs into new groups, as well as consider the ratios of the legacy UEs. Although two groups, e.g., G1 and G2, and two subgroups within the groups, e.g., G1−0 and G1−1 for G1 and G2−0 and G2−1 for G2, any number of groups and sub-groups may be used. The example is merely illustrative of the principle and the actual number of groups/subgroups is not limited to the illustrated example.

In other aspects, the present disclosure can decide how to assign a group WUS sequence or UE group identification. The UEs may be grouped based on weighting factor(s). Information about the grouping and/or the weighting factors can be indicated to the UEs in the system information (SI). In one aspect, a first weighting factor (e.g., W1), a second weighting factor (e.g., W2), G1, and/or G2 can be indicated in the SI. For instance, new or grouping UEs may be divided into new UE1s and new UE2s with weighting factors W1 and W2, respectively. In one aspect, new UE1s for G1 can be grouped based on a formula using the weighting factors W1 and W2, e.g., floor(UE_ID/(N*Ns*Nn))mod(W1+W2) <W1; otherwise, new UE2s for G2 can be chosen, where W1 and W2 are the weighting factor for G1 and G2, respectively, and W1>=0, W2>=0 but W1+W2>0. Also, new UE1s and UE2s can be divided into G1 and G2 subgroups, respectively. The UEs may be separated into the subgroups based on an additional formula, e.g., the group WUS sequence or UE group identification (ID) in G1 groups g1 can be equal to: UE_ID1 mod(G1). Also, UE_ID1 can be based on the following formula: UE_ID1=floor(UE_ID/(N*Ns*Nn)/(W1+W2)) for the UEs belonging to G1. For a new UE2, the UE group ID in G2 groups g2 can be equal to: UE_ID2 mod(G2). UE_ID2 can be equal to: UE_ID2=floor(UE_ID/(N*Ns*Nn)/(W1+W2)) for the UEs belonging to G2. Additionally, in some cases, a partial value of W1, W2, G1, or G2 may be signaled explicitly from the base station to the UEs. For example, for a fixed value of W1, e.g., W1=1, then W2 may be signaled from the base station to the UEs; or W2=1, then W1 may be signaled. Further, the relationship of G1 and G2 can be fixed, e.g., G1=G2 or G1[G2+1], and either G1 or G2 can be signaled. Moreover, these parameters can be fixed in the specification.

In another aspect, the present disclosure can decide how to assign a group WUS sequence or UE group identification based on indicating a parameter or ratio, e.g., R0, in the SI and implicitly indicating W1, W2, G1, and/or G2. For instance, the base station can explicitly indicate the legacy UE ratio, R0, in the SI. Also, G1 and G2 can be predefined based on R0. For example, G1=1, G2=0 if R0>50%; or G1=G2=4 if R0<50%. In another example, G=1, G2=0 if R0≥75%; or G1=4, G2=0 if 75%>R0≥50%; or G1=G2=4 if 50%>R0≥25%; or G1=G2=6 if 25%>R0≥0%. Further, weighting factors W1 and W2 can be predefined based on R0. For example, W1=0 and W2=1 if R1=0; or W1/W2=R1/(1−R1) if 0<R1<1; or W1=1 and W2=0 if R1=1, where R1=max(X %−R0,0). It is noted that in the above examples X can fixed as X %=50% or be configurable to balance the UEs in G1 and G2. Additionally, new or grouping UEs can be divided into new UE1 and new UE2 with weighting factors W1 and W2, respectively. In one aspect, new UE1 for G1 can be grouped based on a formula using the weighting factors W1 and W2, e.g., floor(UE_ID/(N*Ns*Nn))mod (W1+W2)<W1; otherwise, new UE2 for G2 can be chosen. New or grouping UE1s and UE2s may further be divided into G1 and G2 groups, respectively. The UEs may be separated into the subgroups based on an additional formula, e.g., the group WUS sequence or UE group identification (ID) in G1 groups g1 can be equal to: UE_ID1 mod(G1). Also, UE_ID1 can be based on the following formula: UE_ID1=floor(UE_ID/(N*Ns*Nn)/(W1+W2)) for the UEs belonging to G1. For a new UE2, the UE group ID in G2 groups g2 can be equal to: UE_ID2 mod(G2). UE_ID2 can be equal to: UE_ID2=floor(UE_ID/(N*Ns*Nn)/(W1+W2)) for the UEs belonging to G2.

The present disclosure can also provide an extension to WUS multiplexing schemes to enable further power savings. In one aspect, there may be more WUSs for groups based on TDM. For instance, new or grouping UEs can be divided into new UE1s, UE2s, UE3s, and UE4s based on TDM. New UE1s, UE2s, UE3s, and UE4s can be further divided into subgroups G1, G2, G3, and G4. Further, new UE1s, together with legacy UEs, may detect a legacy WUS. A common WUS for subgroups of each group may be multiplexed with a UE-group WUS per subgroup based on single-sequence CDM. Additionally, there can be more WUSs for subgroups based on a single-group CDM. For instance, new or grouping UEs can be divided into new UE1s and UE2s based on TDM. New UE1s and UE2s can be further divided into subgroups G1 and G2. New UE1s, together with legacy UEs, can also detect a legacy WUS. Moreover, more than one common WUS for subgroup combinations of each group can be multiplexed with a UE-group WUS per subgroup based on a single-sequence CDM. For example, if group G1=3, then there can be three UE-group WUSs per subgroup for G1-0, G1-1 and G1-2, respectively; and three common sequences for two different subgroups combinations, such as one common sequence for G1-0 and G1-1, one common sequence for G1-0 and G1-2, and one common sequence for G1-1 and G1-2; and in addition, another common sequence for all subgroups, G1-0, G1-1 and G1-2. In other aspects, the configuration or signaling can be different for the UEs with different configured gap values, such as the UEs with a configured DRX gap, the UEs with a configured eDRX short gap (e.g., if it is a different value from the DRX gap), or the UEs with a configured eDRX long gap (e.g., larger than the DRX gap and eDRX short gap). In further aspects, the configuration or signaling can be 'per carrier' for NB-IoT or 'per narrowband' for MTC.

Figure 14:
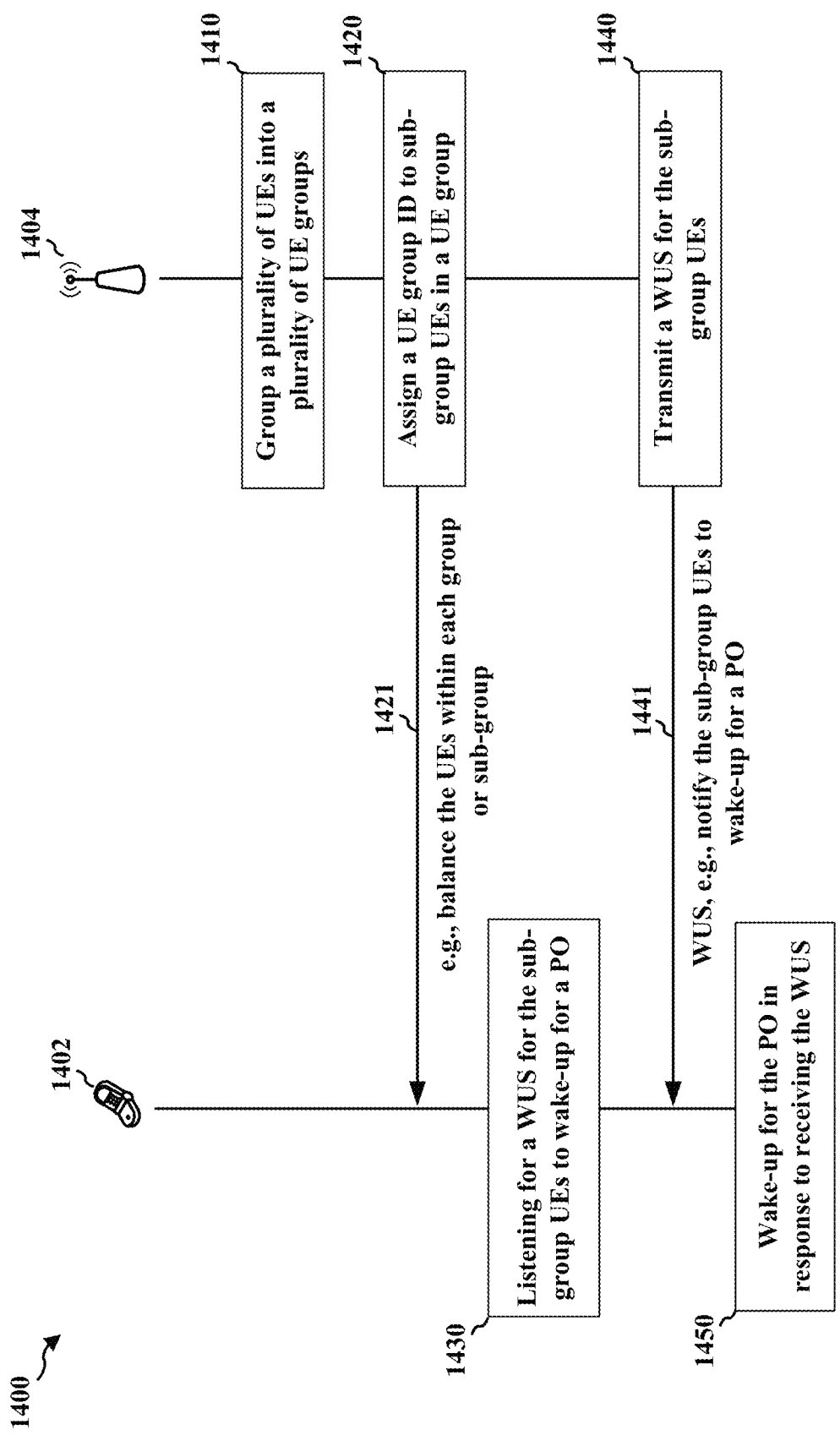
FIG. 14 is a diagram illustrating transmissions between a base station and a UE including a WUS.

FIG. 14 includes a diagram 1400 of communication between base station 1404 and UE 1402. For instance, base station 1404 can group 1410 a plurality of UEs into a plurality of UE groups. Base station 1404 can then assign 1420 a UE group identification or group WUS sequence to one or more sub-group UEs in a UE group, wherein the one or more sub-group UEs include the UE 1402. Next, base station 1404 can transmit 1421 the UE group identification or group WUS sequence to UE 1402. The UE 1402 can then listen 1430 for the WUS identifying which UEs within the UE group should wake-up for a PO. Base station 1404 can then determine and transmit 1440 the WUS 1441 to UE 1402. After receiving the WUS, the UE 1402 can wake-up 1450 for the PO in response to receiving the corresponding WUS identifying certain UEs within the UE group. Moreover, each WUS can comprise a certain duration, which cannot exceed a maximum allowed WUS duration length. Also, between the end of the maximum allowed WUS duration length and the PO, there can be a gap period.

When grouping 1410, base station 1404 can determine the total amount of different UE groups, wherein each individual UE can be assigned to a particular UE group. Within each UE group, there can be different sub-groups of UEs, e.g., including UE 1402. As mentioned previously, within each UE group there can be grouping UEs and/or non-grouping UEs, wherein the updated or grouping UEs are capable of being assigned to a UE group, while the legacy or non-grouping UEs are not capable of being assigned to a UE group. In one aspect, UE 1402 is a new or grouping UE. In other aspects, UE 1402 is a legacy or non-grouping UE. Moreover, in some aspects, each legacy or non-grouping UE can receive the same legacy WUS and each updated or grouping UE can receive a group-specific WUS that targets the particular group or sub-group for that UE. For example, UE 1402 can receive a group-specific WUS that identifies or targets its particular sub-group. Additionally, a legacy WUS can identify which legacy or non-grouping UEs should wake-up for a non-grouping PO. Similarly, the group-specific WUS can identify which updated or grouping UE should wake-up for a group-specific PO. Further, the group-specific WUS and the non-grouping WUS can be staggered and transmitted at different time periods, as well as be transmitted at the same time and share common starting point.

Base station 1404 can also balance the amount of legacy or non-grouping UEs and new or grouping UEs within each particular UE group. For instance, base station 1404 can balance UE 1402 with other grouping and/or non-grouping UEs within its group. This balancing by base station 1404 can be based on a number of different weighting factors or parameters. Also, each legacy WUS and group-specific WUS can be turned on or off by the base station 1404 as needed, for example to further conserve power. The ability to turn on or off a WUS can be specific to a cell or carrier, depending on the type of UE. Furthermore, the ability to turn WUS grouping on or off can be carrier specific. As indicated here, an MME can store the paging capabilities of UE 1402, which can include whether UE 1402 supports WUS and whether UE 1402 supports grouping.

Figure 15:
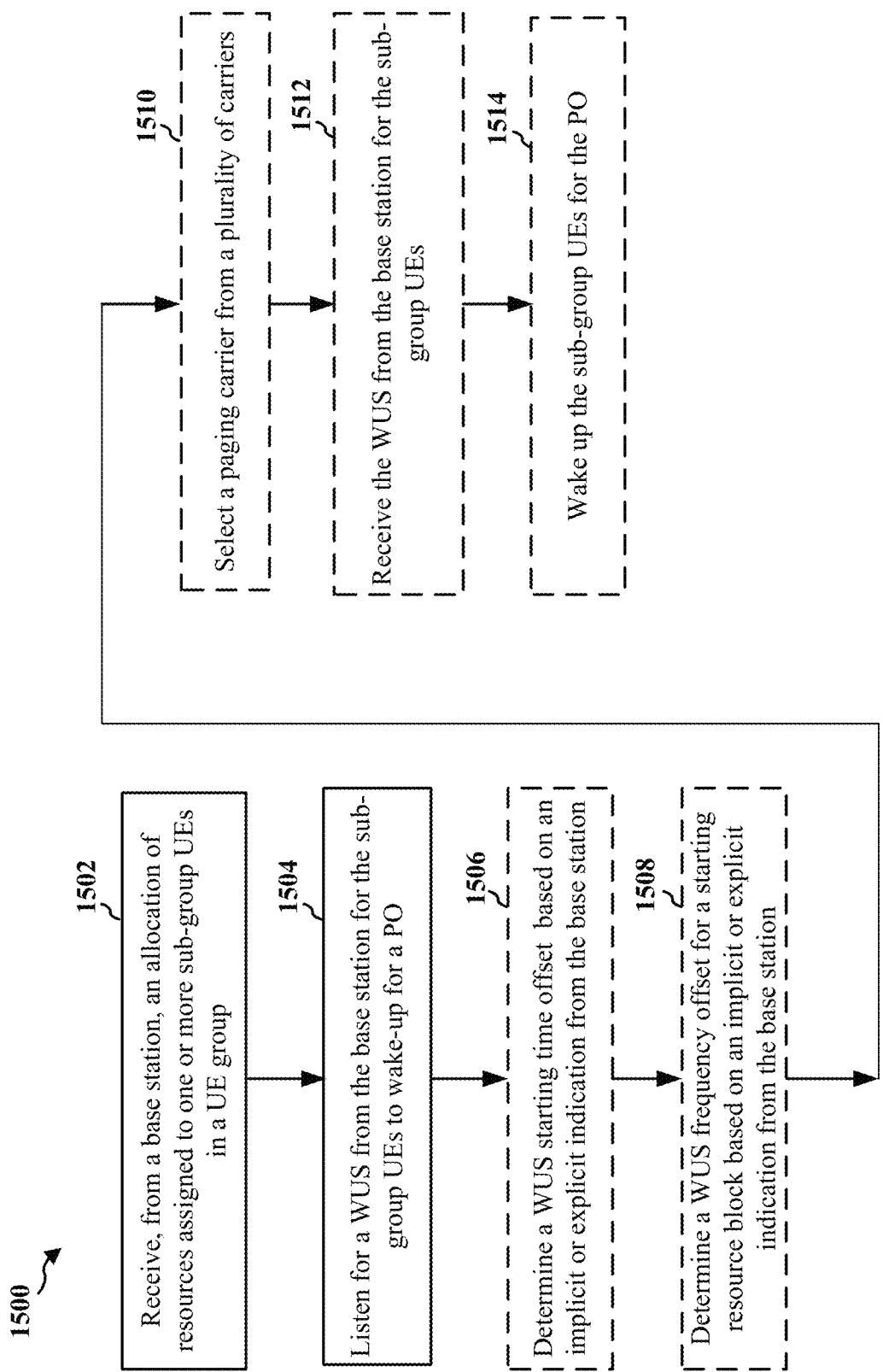
FIG. 15 is a flowchart of a method of wireless communication.

FIG. 15 is a flowchart 1500 of a method of wireless communication. The method may be performed by a UE (e.g., UE 104, 182, 350, 1402, apparatus 1602; the processing system 1714, which may include memory 1706 and which may be the entire UE 350 or a component of the UE 350, such as the TX processor 368, the RX processor 356, and/or the controller/processor 359) communicating with a base station (e.g., base station 102, 180, 310, 1404, apparatus 1902). Optional aspects are illustrated with a dashed line. The methods described herein can provide a number of benefits, such as improving power savings and/or resource utilization.

At 1502, the UE may receive, from a base station, an allocation of resources assigned to one or more sub-group UEs in a UE group. For example, reception component 1614 of apparatus 1602 may receive an allocation of resources. The one or more sub-group UEs may include the UE. At 1504, the UE may listen for a WUS in the resources for the UE group from the base station for the one or more sub-group UEs assigned to the UE group to wake-up for a PO. For example, listening component 1606 of apparatus 1602 may listen for a WUS in the resources for the UE group from the base station. Also, the WUS for the UE group can indicates the UE group for which the WUS is transmitted.

At 1506, the UE may determine a starting time offset of the WUS for the UE group, which can be based on either an implicit indication or an explicit indication received from the base station. For example, starting time offset component 1608 of apparatus 1602 may determine the starting time offset of the WUS. The WUS for the UE group can also be time division multiplexed with at least one other WUS for another UE group. At 1508, the UE may determine a frequency offset for a starting resource block of the WUS for the UE group. For example, frequency offset component 1610 of apparatus 1602 may determine a frequency offset for a starting resource block of the WUS for the UE group. This frequency offset can be based on an implicit indication or an explicit indication received from the base station. Also, the WUS for the UE group can be frequency division multiplexed with at least one other WUS for another UE group.

Additionally, the WUS for the UE group can comprise a group specific WUS. The UE can listen for the group specific WUS without listening for a non-group specific WUS. Further, the group specific WUS for the UE group and the non-group specific WUS can have the same or different starting points. In one aspect, the starting point for the group specific WUS is based on a number of groups of UEs and a maximum WUS duration.

The UE can also listen for a non-group specific WUS from the base station, wherein the non-group specific WUS can indicate for one or more UEs that are not capable of UE grouping, e.g., legacy or non-grouping UEs, to wake-up for the PO. In some aspects, the UE can also wake-up for the PO when either the non-group specific WUS or the WUS for the UE group is received from the base station. Each of the one or more UE groups can comprise one or more grouping UEs and one or more non-grouping UEs. In addition, the UE can listen for the WUS for the UE group and the non-group specific WUS at different starting points. Likewise, the UE can listen for the WUS for the UE group and the non-group specific WUS at a common starting point.

Moreover, one of the UE groups can comprise one or more non-grouping UEs and the remaining UE groups can comprise one or more grouping UEs. The UE can listen for the WUS for the UE group and the non-group specific WUS at the same or different starting points. The UE can also listen for the WUS for the UE group without listening for another WUS. Furthermore, when the UE is grouped with legacy or non-grouping UEs, the WUS for the group can comprise a non-group specific WUS.

At 1510, the UE can select a paging carrier from a plurality of carriers, wherein the plurality of carriers can comprise one or more WUS-enabled carriers and one or more non-WUS-enabled carriers. For example, selection component 1612 of apparatus 1602 may select a paging carrier from a plurality of carriers. In one aspect, the paging carrier can be selected based on whether the UE supports the WUS. Also, when the UE supports the WUS, the paging carrier can be selected from the one or more WUS-enabled carriers. The paging carrier can also be selected from either the one or more WUS-enabled carriers or the one or more non-WUS-enabled carriers based on whether the UE supports WUS. Additionally, the UE may select a paging carrier from a plurality of carriers, wherein said plurality of carriers comprise one or more group-specific WUS carriers and one or more non-grouping WUS carriers. In these aspects, the paging carrier can be selected based on whether the UE supports UE grouping.

At 1512, the UE may receive, from the base station, the WUS for the UE group indicating to the one or more sub-group UEs to wake-up for the PO. For example, reception component 1614 of apparatus 1602 may receive, from the base station, the WUS for the UE group. The WUS for the UE group can also comprise a WUS duration length. This WUS duration length may not exceed a maximum WUS duration, WUSmax, for a non-group specific WUS. Also, the WUS duration length for the UE group may not exceed a maximum WUS duration for the UE group from a common starting point. Moreover, there may be a gap period between the end of the maximum WUS duration and the PO that can be at least as long as a non-group specific gap period between the non-group specific WUS and the PO.

Finally, at 1514, the UE may wake-up one or more of the sub-group UEs for the PO in response to receiving the WUS. For example, wake-up component 1616 of apparatus 1602 may wake-up one or more of the sub-group UEs for the PO.

Figure 16:
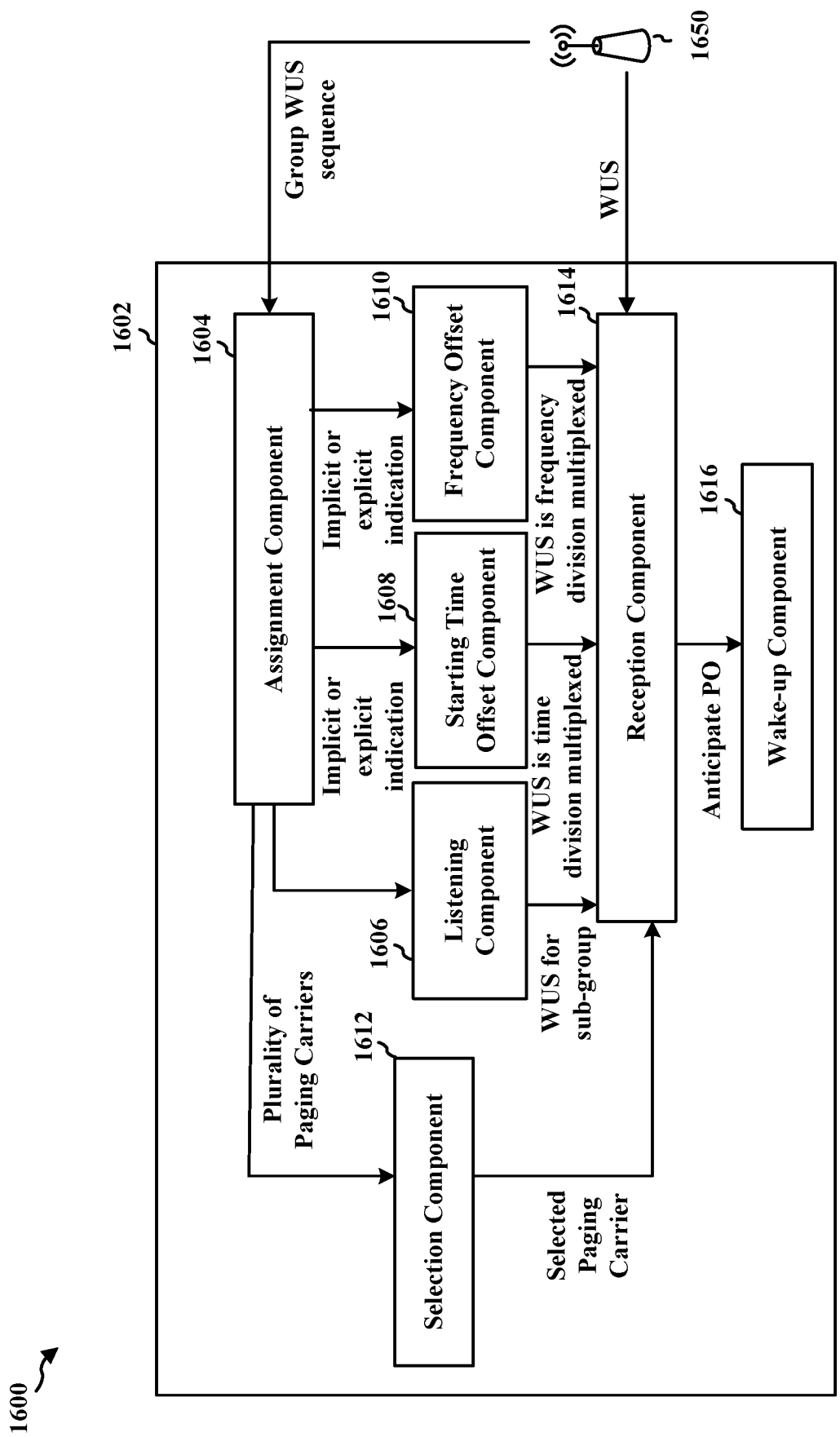
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a UE (e.g., UE 104, 182, 350, 1402) or a component of a UE. The apparatus 1602 includes an assignment component 1604 that receives a group WUS sequence or UE group identification from base station 1650, wherein the group WUS sequence or UE group identification assigns the UE to one or more sub-group UEs in a UE group. The apparatus also includes a listening component 1606 configured to listen for a WUS for the UE group from the base station for the one or more sub-group UEs to wake-up for a PO. A starting time offset component 1608 can determine a WUS starting time offset based on an implicit or explicit indication from the base station 1650, wherein the WUS for the UE group is time division multiplexed with at least one other WUS for another UE group. Also, a frequency offset component 1610 can determine a WUS frequency offset for a starting resource block based on an implicit or explicit indication from the base station 1650, wherein the WUS for the UE group is frequency division multiplexed with at least one other WUS for another UE group.

The apparatus 1602 can also include a selection component 1612 configured to select a paging carrier from a plurality of carriers, wherein the plurality of carriers can comprise one or more WUS-enabled carriers and one or more non-WUS-enabled carriers. Additionally, the apparatus can include a reception component 1614 configured to receive the WUS from the base station 1650 for the UE. Further, the apparatus can include a wake-up component 1616 configured to wake up the UE for the corresponding PO.

The apparatus may include additional components that perform each of the blocks of the algorithm in the aforementioned flowcharts of FIGS. 14 and 15. As such, each block in the aforementioned flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
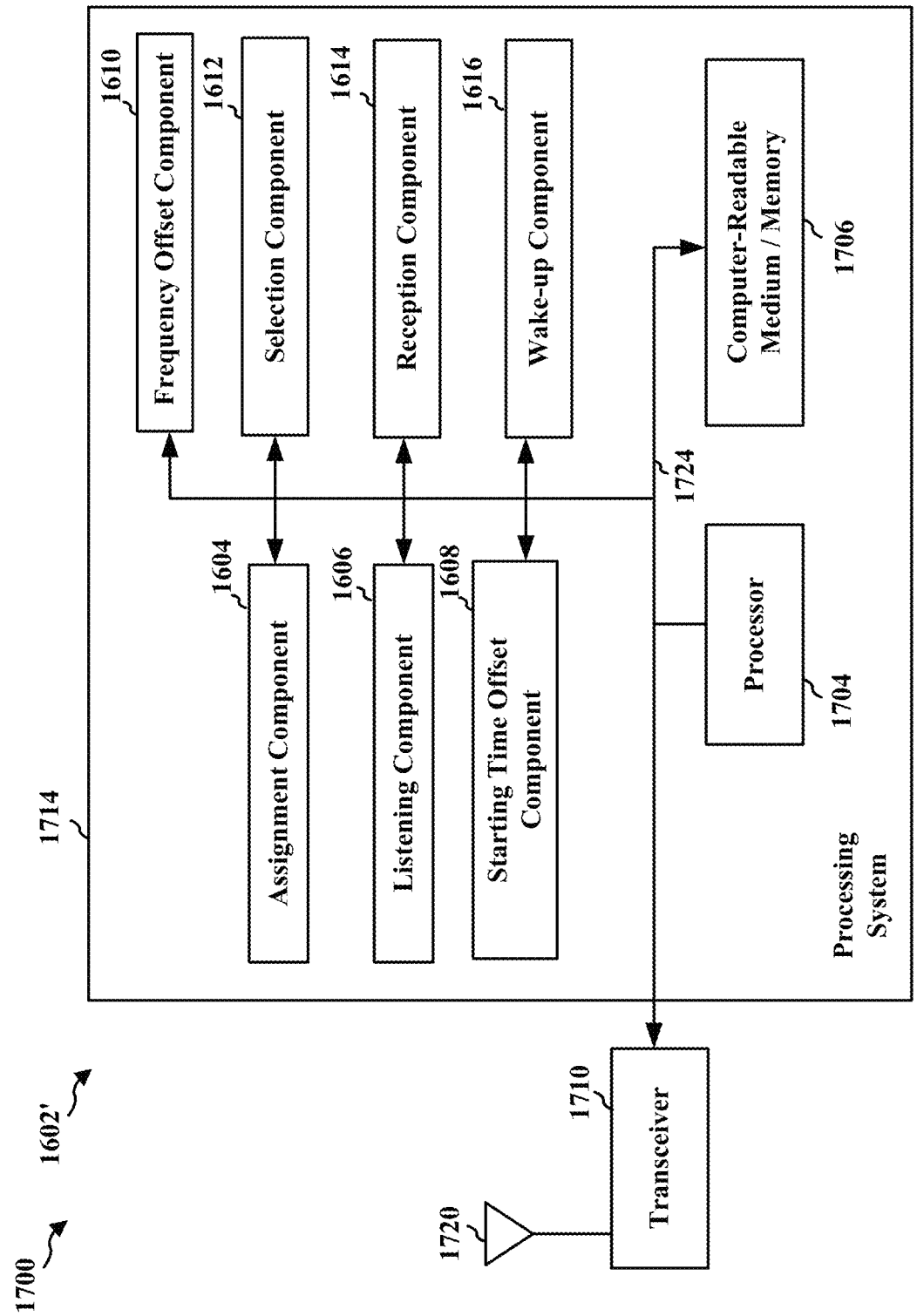
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the assignment component 1604. In addition, the transceiver 1710 receives information from the processing system 1714, specifically the reception component 1614, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, and 1616. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359. Alternatively, the processing system 1714 may comprise the entire UE, e.g., UE 350.

In one configuration, the apparatus 1602/1602' for wireless communication includes means for receiving, from a base station, a group WUS sequence or UE group identification assigned to one or more sub-group UEs in a UE group; means for listening for a WUS from the base station for the sub-group UEs to wake-up for a PO. The apparatus may include means for determining a WUS starting time offset based on an implicit or explicit indication from the base station; means for determining a WUS frequency offset for a starting resource block based on an implicit or explicit indication from the base station. The apparatus may include means for selecting a paging carrier from a plurality of carriers; means for receiving the WUS from the base station for the sub-group UEs. The apparatus may include means for waking-up the sub-group UEs for the PO. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
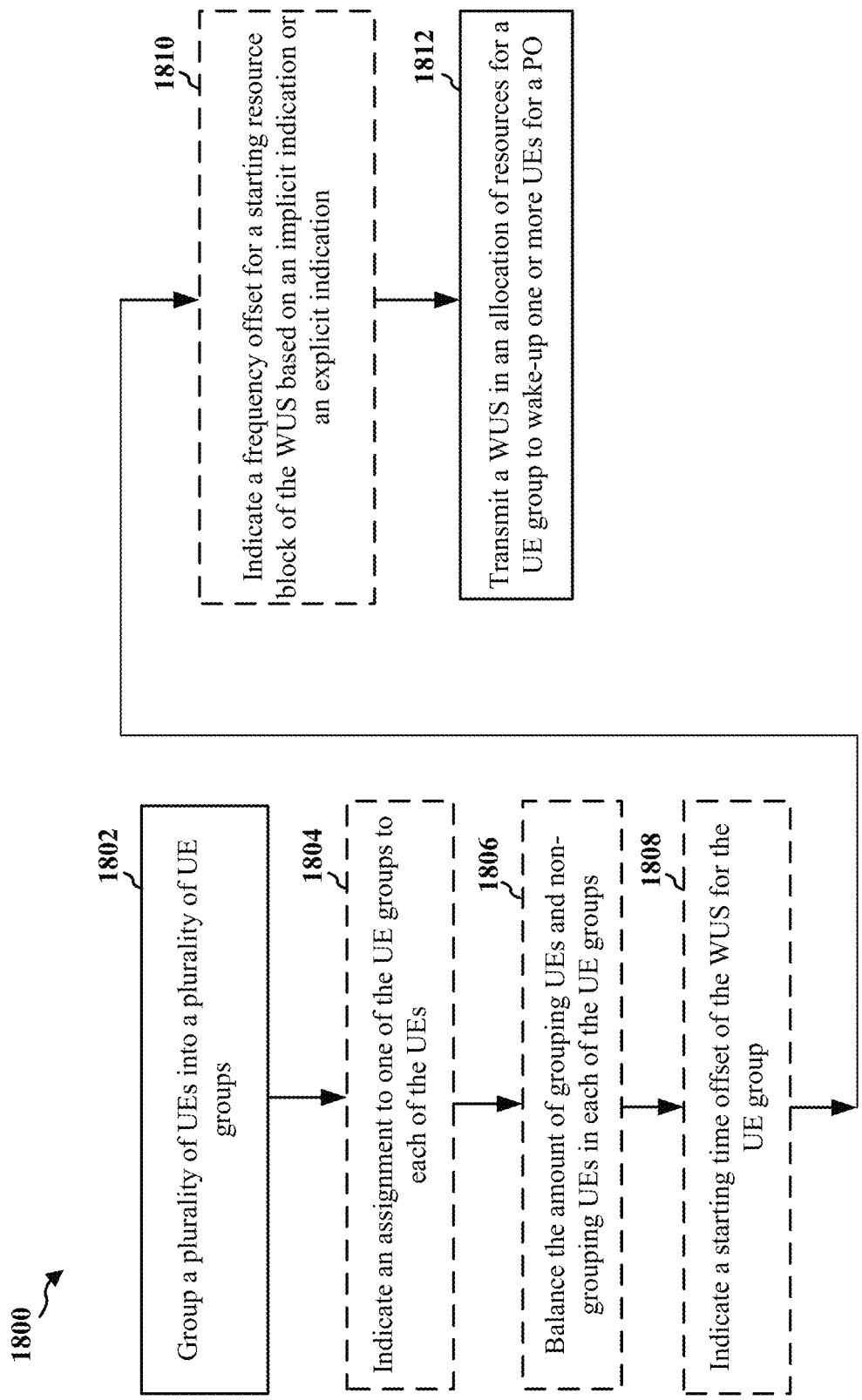
FIG. 18 is a flowchart of a method of wireless communication.

FIG. 18 is a flowchart 1800 of a method of wireless communication. The method may be performed by a base station (e.g., base station 102, 180, 310, 1404, apparatus 1902; the processing system 2014, which may include memory 376 and which may be the entire base station 310 or a component of a base station, such as the TX processor 316, the RX processor 370, and/or the controller/processor 375) communicating with a UE (e.g., UE 104, 182, 350, 1402, the apparatus 1602). Once again, optional aspects may be illustrated with a dashed line. The methods described herein can provide a number of benefits, such as improving power savings and/or resource utilization.

At 1802, the base station can group a plurality of UEs into a plurality of UE groups. For example, grouping component 1904 of apparatus 1902 may group the UEs into the plurality of UE groups. As indicated previously, some of the UEs may be legacy UEs, which are not capable of being grouped for a group-specific WUS. The base station may group these legacy UEs with the grouping UEs, or isolate the legacy UEs in a first group without grouping UEs. At 1804, the base station can indicate to each of the plurality of UEs an assignment to one of the plurality of UE groups. For example, assignment component 1906 of apparatus 1902 may indicate to each of the plurality of UEs an assignment to one of the plurality of UE groups.

At 1808, the base station can indicate a starting time offset of the WUS for the UE group. For example, starting time offset component 1910 of apparatus 1902 may indicate a starting time offset of the WUS for the UE group. The WUS for the UE group is time division multiplexed with at least one other WUS for another UE group. At 1810, the base station can indicate a frequency offset for a starting resource block of the WUS for the UE group based on an implicit indication or an explicit indication. For example, frequency offset component 1912 of apparatus 1902 may indicate a frequency offset for a starting resource block of the WUS for the UE group. The WUS for the UE group can be frequency division multiplexed with at least one other WUS for another UE group.

The WUS for a particular UE group can be transmitted to wake-up one or more grouping UEs for a PO. A non-group specific WUS can be transmitted to wake-up one or more non-grouping UEs for the PO. Further, a non-group specific WUS can be transmitted to wake-up UEs from more than one UE group As indicated above, one or more new or grouping UEs may support UE grouping and one or more legacy or non-grouping UEs may not support UE grouping. Additionally, each of the plurality of UE groups may comprise one or more grouping UEs and one or more non-grouping UEs.

The group specific WUS for the UE group and the non-group specific WUS may have the same or different starting points. However, the group-specific WUS and the non-group specific WUS may have a common starting point as well. The starting point for the group specific WUS may be based on a number of groups into which the plurality of UEs are divided, as well as a maximum WUS duration.

The different UE groups may comprise a variety of types of UEs. For instance, a first UE group may comprise one or more non-grouping UEs and the remaining UE groups may comprise one or more grouping UEs. Additionally, a first UE group can comprise a combination of one or more non-grouping UEs and a percentage of one or more grouping UEs, wherein the remaining grouping UEs are grouped into the remaining UE groups.

As mentioned previously, the amount of UEs within each group can be balanced. At 1806, the base station can balance the amount of one or more grouping UEs and one or more non-grouping UEs in each of the one or more UE groups. For example, balancing component 1908 of apparatus 1902 may balance the amount of one or more grouping UEs and one or more non-grouping UEs in each of the one or more UE groups. This balancing can be based on one or more weighting factors, as discussed above.

As further mentioned herein a paging carrier can be selected from a plurality of carriers, wherein the plurality of carriers can comprise one or more WUS-enabled carriers and one or more non-WUS-enabled carriers. In one aspect, the paging carrier can be selected based on whether the UE supports the WUS. In addition, when the UE supports the WUS, the paging carrier can be selected from the one or more WUS-enabled carriers. The paging carrier can also be selected from either the one or more WUS-enabled carriers or the one or more non-WUS-enabled carriers based on whether the UE supports WUS. Moreover, the paging carrier can be selected from a plurality of carriers, wherein said plurality of carriers comprise one or more group-specific WUS carriers and one or more non-grouping WUS carriers. In these aspects, the paging carrier can be selected based on whether the UE supports UE grouping At 1812, the base station may transmit a WUS in an allocation of resources for one or more UE groups to wake-up one or more UEs for a PO. For example, transmission component 1914 of apparatus 1902 may transmit a WUS in an allocation of resources for one or more UE groups to wake-up one or more UEs for a PO. The WUS for the UE group can also comprise a WUS duration length. This WUS duration length may not exceed a maximum WUS duration, WUSmax, for a non-group specific WUS. Also, the WUS duration length for the UE group may not exceed a maximum WUS duration for the UE group from a common starting point. Moreover, there may be a gap period between the end of the maximum WUS duration and the PO that can be at least as long as a non-group specific gap period between the non-group specific WUS and the PO.

Finally, one or more group or sub-group UEs may wake-up for a PO in response to receiving the WUS from the base station.

Figure 19:
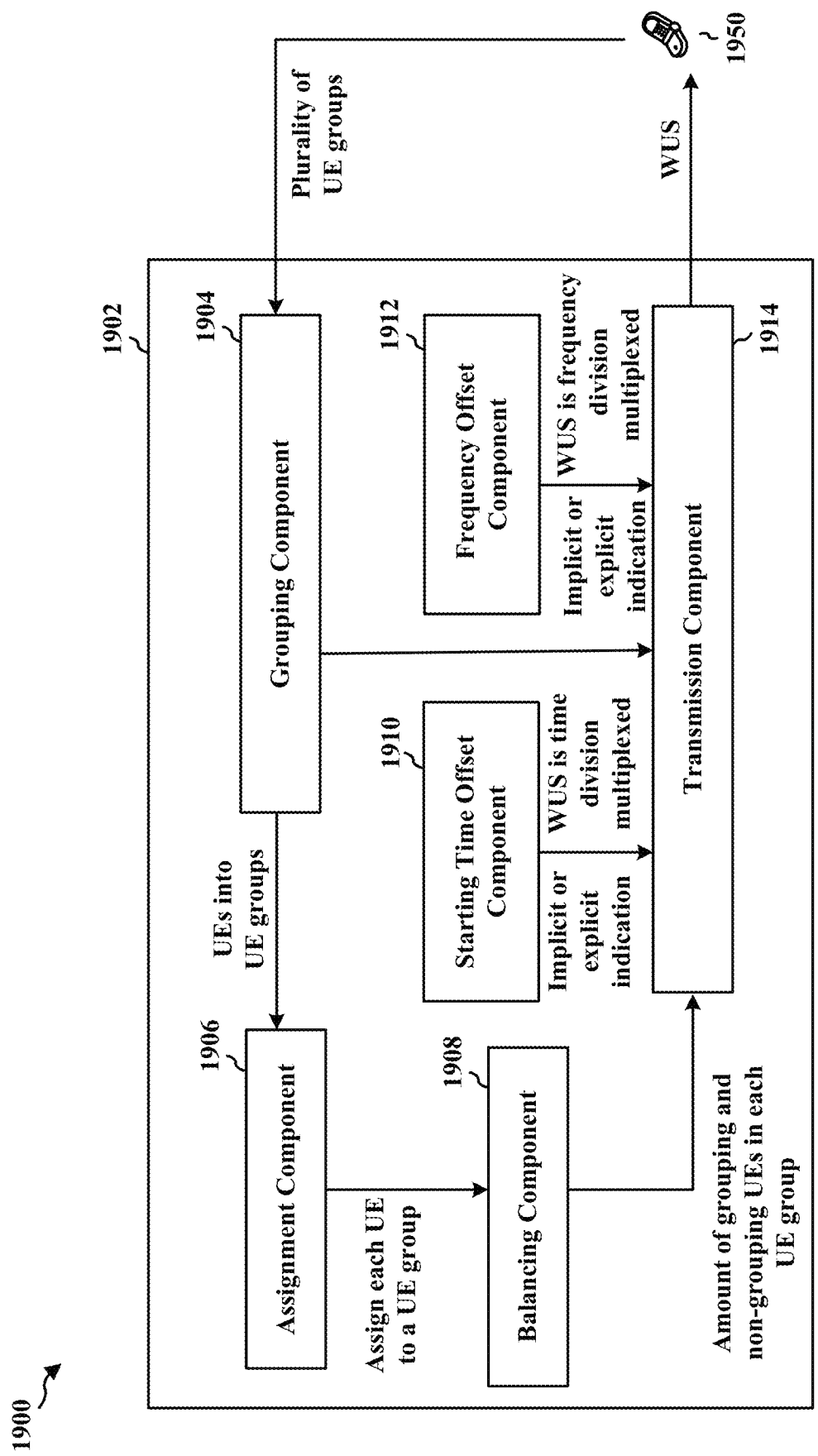
FIG. 19 is a conceptual data flow diagram illustrating the data flow between different means/components in an example apparatus.

FIG. 19 is a conceptual data flow diagram 1900 illustrating the data flow between different modules/means/components in an example apparatus 1902. The apparatus may be a base station (e.g., base station 102, 180, 310, 1404) or may be a component of a base station. The apparatus 1902 includes a grouping component 1904 configured to group a plurality of UEs into a plurality of UE groups. The apparatus can also include assignment component 1906 configured to indicate an assignment to one of the plurality of UE groups to each of the plurality of UEs. The apparatus can further include balancing component 1908 configured to balance the amount of grouping UEs and non-grouping UEs in each of the UE groups.

A starting time offset component 1910 can indicate a WUS starting time offset based on an implicit or explicit indication, wherein the WUS for the UE group is time division multiplexed with at least one other WUS for another UE group. Also, a frequency offset component 1912 can indicate a WUS frequency offset for a starting resource block based on an implicit or explicit indication, wherein the WUS for the UE group is frequency division multiplexed with at least one other WUS for another UE group. Additionally, the apparatus can include a transmission component 1914 configured to transmit the WUS for a UE group to the UE, e.g., UE 1950.

The apparatus may include additional components that perform each of the blocks of the algorithm in the aforementioned flowcharts of FIGS. 14 and 18. As such, each block in the aforementioned flowcharts of FIGS. 14 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
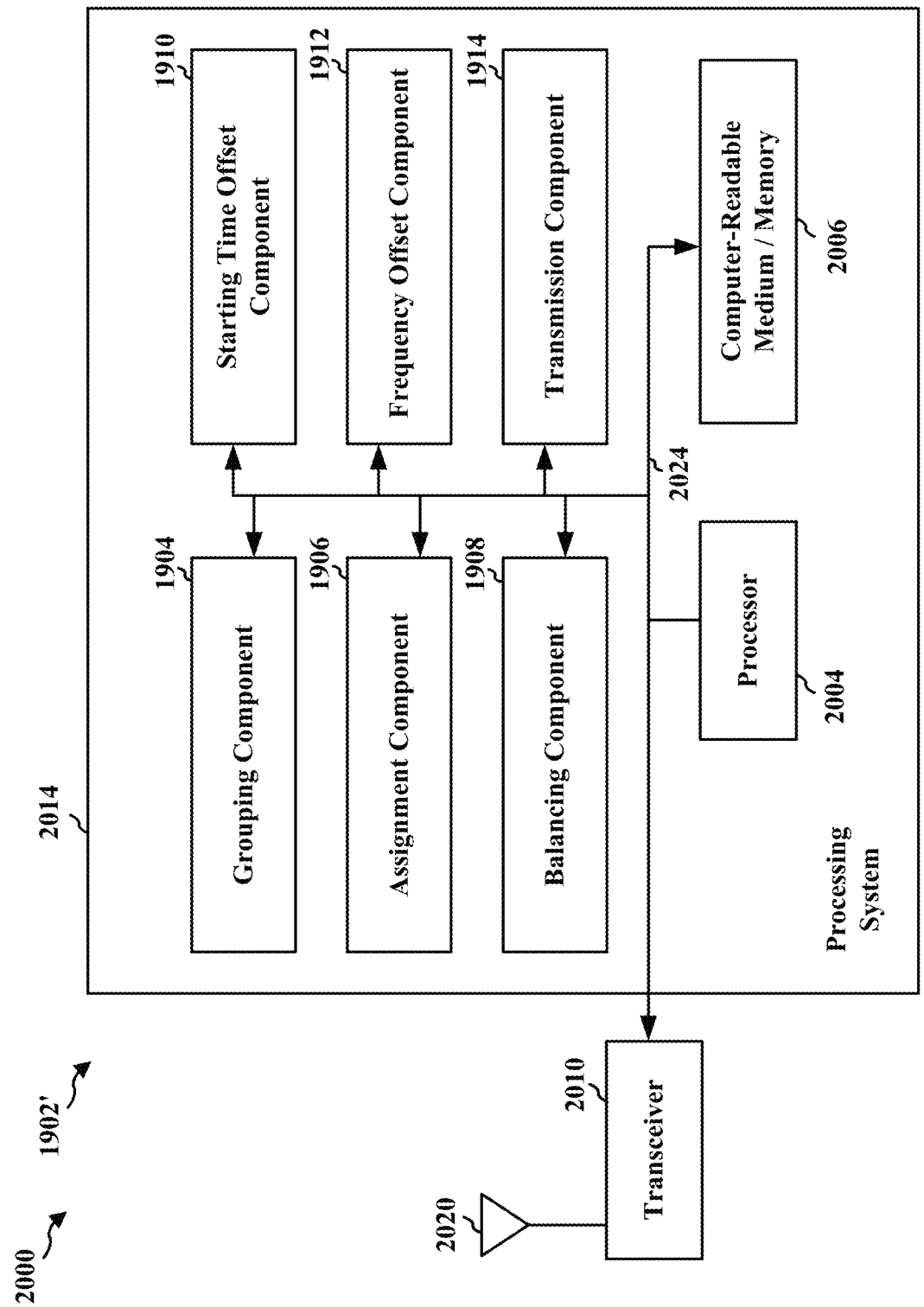
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, 1914, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the grouping component 1904. In addition, the transceiver 2010 receives information from the processing system 2014, specifically the transmission component 1914, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912, and 1914. The components may be software components running in the processor 2004, resident/stored in the computer readable medium/memory 2006, one or more hardware components coupled to the processor 2004, or some combination thereof. The processing system 2014 may be a component of the base station 310 and may include the memory 376 and/or at least one of the TX processor 316, the RX processor 370, and the controller/processor 375. Alternatively, the processing system 2014 may be the entire base station, e.g., base station 310.

In one configuration, the apparatus 1902/1902' for wireless communication includes means for grouping a plurality of UEs into a plurality of UE groups. The apparatus may include means for indicating an assignment to one of the UE groups to each of the UEs. The apparatus may include means for balancing the amount of grouping UEs and non-grouping UEs in each of the UE groups. The apparatus may include means for indicating a starting time offset of the WUS for the UE group. The apparatus may include means for indicating a frequency offset for a starting resource block of the WUS based on an implicit indication or an explicit indication. The apparatus may include means for transmitting a WUS for a UE group to wake-up one or more UEs for a PO. The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) comprising:
transmitting paging capability information indicating that the UE supports group wake-up signals (WUSs) for paging occasions;
receiving, from a base station, an allocation of resources assigned to one or more sub-group UEs in a UE group, wherein the one or more sub-group UEs include the UE, wherein a first amount of the one or more sub-group UEs is less than a second amount of UEs in the UE group; and
listening for a wake-up signal (WUS) from the base station in the resources for the UE group for the one or more sub-group UEs assigned to the UE group to wake-up for a paging occasion (PO), the WUS for the UE group being separated from a non-group specific WUS in a time domain based on a timing relation.

2. The method of claim 1, wherein the resources for the UE group indicate the UE group for which the WUS is transmitted.

3. The method of claim 1, wherein the resources for the UE group are identified by at least one of time resources, frequency resources, sequences, or power allocated for WUS transmission.

4. The method of claim 1, further comprising:
receiving, from the base station, the WUS for the UE group indicating to the one or more sub-group UEs to wake-up for the PO; and
waking up for the PO for the UE group of one or more of the sub-group UEs in response to receiving the WUS.

5. The method of claim 1, wherein the WUS for the UE group comprises a WUS duration length which does not exceed a maximum WUS duration for the non-group specific WUS.

6. The method of claim 1, further comprising:
determining a starting time offset of the WUS for the UE group based on an indication received from the base station, wherein the WUS for the UE group is time division multiplexed with at least one other WUS.

7. The method of claim 1, wherein the WUS for the UE group is code division multiplexed with at least one other WUS.

8. The method of claim 1, further comprising:
determining a frequency offset for a starting resource block of the WUS for the UE group based on an indication received from the base station, wherein the WUS for the UE group is frequency division multiplexed with at least one other WUS.

9. The method of claim 1, wherein the WUS for the UE group comprises a group specific WUS, wherein the UE listens for the group specific WUS without listening for the non-group specific WUS, wherein the group specific WUS for the UE group and the non-group specific WUS have different starting points, and wherein a starting point for the group specific WUS is based on at least one of a number of groups of UEs and a maximum WUS duration.

10. The method of claim 1, further comprising:
listening for the non-group specific WUS from the base station, wherein the non-group specific WUS indicates for one or more UEs that are not capable of UE grouping to wake-up for the PO,
wherein the UE wakes-up for the PO when either the non-group specific WUS or the WUS for the UE group is received from the base station.

11. The method of claim 10, wherein the UE listens for the WUS for the UE group with different resources than that of the non-group specific WUS.

12. The method of claim 1, wherein the UE listens for the WUS for the UE group without listening for an additional WUS, wherein when the UE listens for the WUS for the UE group in same resources with UEs that do not have UE grouping capability the UE listens for the non-group specific WUS.

13. The method of claim 1, further comprising:
selecting a paging carrier from a plurality of carriers, wherein said plurality of carriers comprise one or more WUS-enabled carriers and one or more non-WUS-enabled carriers,
wherein the paging carrier is selected based on whether the UE supports the WUS.

14. The method of claim 1, further comprising:
selecting a paging carrier from a plurality of carriers that comprise one or more WUS-enabled carriers and one or more non-WUS-enabled carriers,
wherein the paging carrier is selected from either the one or more WUS-enabled carriers or the one or more non-WUS-enabled carriers based on whether the UE supports the WUS.

15. The method of claim 1, further comprising:
selecting a paging carrier from a plurality of carriers, wherein said plurality of carriers comprise one or more group-specific WUS carriers and one or more non-grouping WUS carriers,
wherein the paging carrier is selected based on whether the UE supports UE grouping.

16. The method of claim 1, wherein the one or more sub-group UEs in the UE group are assigned resources for a group WUS based on a time gap between the WUS for the one or more sub-group UEs and the PO.

17. The method of claim 1, wherein the WUS is a first WUS, and the base station configures a different time between the PO and a second WUS for one sub-group and a third WUS for another sub-group.

18. The method of claim 1, wherein the base station transmits the WUS for a first sub-group using a different sequence than a second WUS for a second sub-group.

19. The method of claim 1, wherein the one or more sub-group UEs use two or more multiplexing schemes, wherein a different number of multiplexing schemes is used if a number of one or more sub-group UEs exceeds a threshold value.

20. The method of claim 1, further comprising:
shifting a time period until the PO for at least one of the one or more sub-group UEs, wherein the time period until the PO is shifted using a predefined pattern selected based on a timing of the PO.

21. The method of claim 1, wherein the one or more sub-group UEs include a first group of UEs and a second group of UEs, wherein the WUS for the first group of UEs comprises at least one of the non-group specific WUS, a first common WUS, or a first group WUS, wherein the WUS for the second group of UEs comprises at least one of a second common WUS or a second group WUS.

22. The method of claim 21, wherein the non-group specific WUS indicates at least one first UE without a grouping capability or a first set of multiple UEs from different sub-groups within the first group of UEs to wake-up for the PO, wherein the first common WUS indicates a second set of multiple UEs from different sub-groups within the first group of UEs to wake-up for the PO without indicating for a different capability UE without the grouping capability to wake-up, wherein the first group WUS indicates at least one second UE from a first, single sub-group in the first group of UEs to wake-up for the PO, wherein the second common WUS indicates for third set of multiple UEs from different sub-groups in the second group of UEs to wake-up for the PO, wherein the second group WUS indicates for at least one third UE from a second, single sub-group within the second group of UEs to wake-up for the PO.

23. The method of claim 21, wherein the first group of UEs are assigned a first group WUS sequence based on at least a first UE ID, a first weighting factor, and a first sub-group number for first group UEs, and the second group of UEs are assigned a second group WUS sequence based on at least a second UE ID, a second weighting factor, and a second sub-group number for second group UEs.

24. The method of claim 23, wherein the first group of UEs, the second group of UEs, the first weighting factor, or the second weighting factor are fixed or predefined based on at least a first system information (SI) parameter, wherein the first sub-group number for the first group of UEs or the second sub-group number for the second group of UEs are fixed or predefined based on at least a second SI parameter, wherein the first common WUS for sub-group UEs in the first group of UEs or the second common WUS for sub-group UEs in the second group of UEs are fixed or predefined based on at least a third SI parameter.

25. The method of claim 1, wherein the WUS for the UE group and the non-group specific WUS are staggered and transmitted at different time periods.

26. The method of claim 1, wherein a first time gap between the WUS for the UE group and the PO is greater than or equal to a second time gap between the non-group specific WUS and the PO.

27. The method of claim 26, wherein the first time gap is larger than the second time gap.

28. The method of claim 1, wherein the non-group specific WUS is configured for multiple UEs.

29. A method of wireless communication at a base station comprising:
receiving paging capability information indicating group wake-up signals (WUSs) for paging occasions capabilities of a plurality of user equipments (UEs);
grouping, based on the paging capability information, the plurality of UEs into a plurality of UE groups; and
transmitting a WUS in an allocation of resources for a UE group from among the plurality of UE groups, the allocation of resources being assigned to one or more sub-group UEs in the UE group, wherein a first amount of the one or more sub-group UEs is less than a second amount of UEs in the UE group, the WUS for the UE group being separated from a non-group specific WUS in a time domain based on a timing relation.

30. The method of claim 29, further comprising:
indicating an assignment to one of the plurality of UE groups to each of the plurality of UEs, wherein the assignment to one of the plurality of UE groups is indicated with the resources.

31. The method of claim 29, wherein the WUS for the UE group comprises a WUS duration length which does not exceed a maximum WUS duration for the non-group specific WUS.

32. The method of claim 29, further comprising:
indicating a starting time offset of the WUS for the UE group, wherein the WUS for the UE group is time division multiplexed with at least one other WUS for an additional UE group from among the plurality of UE groups.

33. The method of claim 29, further comprising:
indicating a frequency offset for a starting resource block of the WUS for the UE group based on one of an implicit indication and an explicit indication received, wherein the WUS for the UE group is frequency division multiplexed with at least one other WUS for an additional UE group from among the plurality of UE groups.

34. The method of claim 29, wherein the WUS for the UE group is transmitted to wake-up one or more grouping UEs for a first paging occasion (PO), the method further comprising:
transmitting the non-group specific WUS to wake-up one or more legacy UEs for a second PO, wherein the one or more sub-group UEs support UE grouping and the one or more legacy UEs do not support group specific WUSs, wherein each of the plurality of UE groups comprises at least one grouping UEs and at least one legacy UEs.

35. The method of claim 29, wherein a first UE group comprises one or more legacy UEs and at least one remaining UE group comprises one or more grouping UEs, the method further comprising:
transmitting the non-group specific WUS to wake-up UEs from more than one UE group.

36. The method of claim 29, wherein a first UE group comprises one or more legacy UEs and at least one remaining UE group comprises one or more grouping UEs, wherein a group-specific WUS corresponding to the at least one remaining UE group and the non-group specific WUS corresponding to the first UE group have different starting points.

37. The method of claim 29, further comprising:
balancing an amount of one or more grouping UEs and one or more legacy UEs in each of the plurality of UE groups,
wherein the balancing is based on one or more weighting factors.

38. The method of claim 29, wherein a paging carrier is selected from a plurality of carriers, wherein said plurality of carriers comprise one or more WUS-enabled carriers and one or more non-WUS-enabled carriers,
wherein the paging carrier for a UE is selected based on whether the UE supports the WUS.

39. The method of claim 29, wherein the one or more sub-group UEs in the UE group are assigned a group WUS sequence based on a time gap between the WUS for the one or more sub-group UEs and a paging occasion (PO).

40. The method of claim 29, wherein the WUS is a first WUS, and further comprising:
configuring a different time between a paging occasion (PO) and a second WUS for one sub-group and a third WUS for another sub-group.

41. The method of claim 29, wherein the WUS is associated with a first WUS and a second WUS, and wherein at least a first portion of the first WUS for one sub-group overlaps with at least a second portion of the second WUS for a second sub-group, the method further comprising:
boosting a power to an overlapping region comprising the first portion of the first WUS for the one sub-group and the second portion of the second WUS for the second sub-group; and
transmitting the first WUS for the one sub-group using a different sequence than the second WUS for the second sub-group.

42. The method of claim 29, further comprising:
shifting a time period until a paging occasion (PO) for at least one of the plurality of UE groups, wherein the time period until the PO is shifted using predefined patterns selected based on a timing of the PO.

43. The method of claim 29, wherein the plurality of UE groups includes a first group of UEs and a second group of UEs, wherein the WUS for the first group of UEs comprises at least one of the non-group specific WUS, a first common WUS, or a first group WUS, wherein the WUS for the second group of UEs comprises at least one of a second common WUS or a second group WUS.

44. The method of claim 29, wherein the WUS for the UE group and the non-group specific WUS are staggered and transmitted at different time periods.

45. The method of claim 29, wherein a first time gap between the WUS for the UE group and a paging occasion (PO) is greater than or equal to a second time gap between the non-group specific WUS and the PO.

46. An apparatus for wireless communication at a user equipment (UE), comprising:
means for transmitting paging capability information indicating that the UE supports group WUSs for paging occasions;
means for receiving, from a base station, an allocation of resources assigned to one or more sub-group UEs in a UE group, wherein the one or more sub-group UEs include the UE, wherein a first amount of the one or more sub-group UEs is less than a second amount of UEs in the UE group; and means for listening for a wake-up signal (WUS) from the base station in the resources for the UE group for the one or more sub-group UEs assigned to the UE group to wake-up for a paging occasion (PO), the WUS for the UE group being separated from a non-group specific WUS in a time domain based on a timing relation.

47. The apparatus of claim 46, further comprising:
means for receiving, from the base station, the WUS for the UE group indicating to the one or more sub-group UEs to wake-up for the PO; and
means for waking up, for the PO for the UE group, one or more of the sub-group UEs in response to receiving the WUS.

48. The apparatus of claim 46, further comprising:
means for determining a starting time offset of the WUS for the UE group based on an indication received from the base station, wherein the WUS for the UE group is time division multiplexed with at least one other WUS.

49. The apparatus of claim 46, further comprising:
means for determining a frequency offset for a starting resource block of the WUS for the UE group based on an indication received from the base station, wherein the WUS for the UE group is frequency division multiplexed with at least one other WUS.

50. The apparatus of claim 46, further comprising:
means for listening for the non-group specific WUS from the base station, wherein the non-group specific WUS indicates for one or more UEs that are not capable of UE grouping to wake-up for the PO,
wherein the UE wakes-up for the PO when either the non-group specific WUS or the WUS for the UE group is received from the base station.

51. The apparatus of claim 46, further comprising:
means for shifting a time period until the PO for at least one of the one or more sub-group UEs.

52. An apparatus for wireless communication, comprising:
means for receiving paging capability information indicating group WUSs for paging occasions capabilities of a plurality of user equipments (UEs);
means for grouping, based on the paging capability information, the plurality of UEs into a plurality of UE groups; and
means for transmitting a WUS in an allocation of resources for a UE group from among the plurality of UE groups, the allocation of resources being assigned to one or more sub-group UEs in the UE group, wherein a first amount of the one or more sub-group UEs is less than a second amount of UEs in the UE group, the WUS for the UE group being separated from a non-group specific WUS in a time domain based on a timing relation.

53. The apparatus of claim 52, further comprising:
means for indicating an assignment to one of the plurality of UE groups to each of the plurality of UEs, wherein the assignment to one of the plurality of UE groups is indicated with the resources.

54. The apparatus of claim 52, further comprising:
means for indicating a frequency offset for a starting resource block of the WUS for the UE group based on one of an implicit indication and an explicit indication received, wherein the WUS for the UE group is frequency division multiplexed with at least one other WUS for an additional UE group.

55. The apparatus of claim 52, further comprising:
means for transmitting the non-group specific WUS to wake-up one or more legacy UEs for a paging occasion (PO).

56. The apparatus of claim 52, further comprising:
means for balancing an amount of one or more grouping UEs and one or more legacy UEs in each of the plurality of UE groups,
wherein the balancing is based on one or more weighting factors.

57. The apparatus of claim 52, wherein the WUS is a first WUS, and further comprising:
means for configuring a different time between a paging occasion (PO) and a second WUS for one sub-group and a third WUS for another sub-group.

58. The apparatus of claim 52, further comprising:
means for boosting a power to an overlapping region comprising a first portion of the WUS for one sub-group and a second portion of a second WUS for a second sub-group; and
means for transmitting the WUS for the one sub-group using a different sequence than the second WUS for the second sub-group.

59. An apparatus for wireless communication at a user equipment (UE), comprising:
memory; and
at least one processor coupled to the memory and configured to:
transmit paging capability information indicating that the UE supports group WUSs for paging occasions;
receive, from a base station, an allocation of resources assigned to one or more sub-group UEs in a UE group, wherein the one or more sub-group UEs include the UE, wherein a first amount of the one or more sub-group UEs is less than a second amount of UEs in the UE group; and
listen for a wake-up signal (WUS) from the base station in the resources for the UE group for the one or more sub-group UEs assigned to the UE group to wake-up for a paging occasion (PO), the WUS for the UE group being separated from a non-group specific WUS in a time domain based on a timing relation.

60. The apparatus of claim 59, wherein the at least one processor is further configured to:
receive, from the base station, the WUS for the UE group indicating to the one or more sub-group UEs to wake-up for the PO; and
wake up, for the PO for the UE group, one or more of the sub-group UEs in response to receiving the WUS.

61. The apparatus of claim 59, wherein the at least one processor is further configured to:
determine a starting time offset of the WUS for the UE group based on an indication received from the base station, wherein the WUS for the UE group is time division multiplexed with at least one other WUS.

62. The apparatus of claim 59, wherein the at least one processor is further configured to:
determine a frequency offset for a starting resource block of the WUS for the UE group based on an indication received from the base station, wherein the WUS for the UE group is frequency division multiplexed with at least one other WUS.

63. The apparatus of claim 59, wherein the at least one processor is further configured to:
listen for the non-group specific WUS from the base station, wherein the non-group specific WUS indicates for one or more UEs that are not capable of UE grouping to wake-up for the PO, wherein the UE wakes-up for the PO when either the non-group specific WUS or the WUS for the UE group is received from the base station.

64. The apparatus of claim 59, wherein the at least one processor is further configured to:
shift a time period until the PO for at least one of the one or more sub-group UEs.

65. The apparatus of claim 59, wherein the WUS for the UE group and the non-group specific WUS are staggered and transmitted at different time periods.

66. The apparatus of claim 59, wherein a first time gap between the WUS for the UE group and the PO is greater than or equal to a second time gap between the non-group specific WUS and the PO.

67. The apparatus of claim 66, wherein the first time gap is larger than the second time gap.

68. An apparatus for wireless communication, comprising:
memory; and
at least one processor coupled to the memory and configured to:
receive paging capability information indicating group WUSs for paging occasions capabilities of a plurality of user equipments (UEs);
group, based on the paging capability information, the plurality of UEs into a plurality of UE groups; and
transmit a WUS in an allocation of resources for a UE group from among the plurality of UE groups, the allocation of resources being assigned to one or more sub-group UEs in the UE group, wherein a first amount of the one or more sub-group UEs is less than a second amount of UEs in the UE group, the WUS for the UE group being separated from a non-group specific WUS in a time domain based on a timing relation.

69. The apparatus of claim 68, wherein the at least one processor is further configured to:
indicate an assignment to one of the plurality of UE groups to each of the plurality of UEs, wherein the assignment to one of the plurality of UE groups is indicated with the resources.

70. The apparatus of claim 68, wherein the at least one processor is further configured to:
indicate a frequency offset for a starting resource block of the WUS for the UE group based on one of an implicit indication and an explicit indication received, wherein the WUS for the UE group is frequency division multiplexed with at least one other WUS for an additional UE group.

71. The apparatus of claim 68, wherein the at least one processor is further configured to:
transmit the non-group specific WUS to wake-up one or more legacy UEs for a paging occasion (PO).

72. The apparatus of claim 68, wherein the at least one processor is further configured to:
balance an amount of one or more grouping UEs and one or more legacy UEs in each of the plurality of UE groups,
wherein the balance is based on one or more weighting factors.

73. The apparatus of claim 68, wherein the WUS is a first WUS, and the at least one processor is further configured to:
configure a different time between a paging occasion (PO) and a second WUS for one sub-group and a third WUS for another sub-group.

74. The apparatus of claim 68, wherein the at least one processor is further configured to:
boost a power to an overlapping region comprising a first portion of the WUS for one sub-group and a second portion of a second WUS for a second sub-group; and
transmit the WUS for the one sub-group using a different sequence than the second WUS for the second sub-group.

75. The apparatus of claim 68, wherein the WUS for the UE group and the non-group specific WUS are staggered and transmitted at different time periods.

76. The apparatus of claim 68, wherein a first time gap between the WUS for the UE group and a paging occasion (PO) is greater than or equal to a second time gap between the non-group specific WUS and the PO.

77. A non-transitory computer-readable medium storing computer executable code for wireless communication at a user equipment (UE), the code when executed by at least one processor causes the UE to:
transmit paging capability information indicating that the UE supports group WUSs for paging occasions;
receive, from a base station, an allocation of resources assigned to one or more sub-group UEs in a UE group, wherein the one or more sub-group UEs include the UE, wherein a first amount of the one or more sub-group UEs is less than a second amount of UEs in the UE group; and
listen for a wake-up signal (WUS) from the base station in the resources for the UE group for the one or more sub-group UEs assigned to the UE group to wake-up for a paging occasion (PO), the WUS for the UE group being separated from a non-group specific WUS in a time domain based on a timing relation.

78. A non-transitory computer-readable medium storing computer executable code for wireless communication at a base station, the code when executed by at least one processor causes the base station to:
receive paging capability information indicating group WUSs for paging occasions capabilities of a plurality of user equipments (UEs);
group, based on the paging capability information, the plurality of UEs into a plurality of UE groups; and
transmit a WUS in an allocation of resources for a UE group from among the plurality of UE groups, the allocation of resources being assigned to one or more sub-group UEs in the UE group, wherein a first amount of the one or more sub-group UEs is less than a second amount of UEs in the UE group, the WUS for the UE group being separated from a non-group specific WUS in a time domain based on a timing relation.

* * * * *